United States Patent
Kanakubo

(10) Patent No.: US 9,952,817 B2
(45) Date of Patent: Apr. 24, 2018

(54) PRINTING SYSTEM, MOBILE TERMINAL, AND CONTROL METHOD

(71) Applicant: CANON KABUSHIKI KAISHA, Tokyo (JP)

(72) Inventor: Yukio Kanakubo, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/010,479

(22) Filed: Jan. 29, 2016

(65) Prior Publication Data

US 2016/0239244 A1 Aug. 18, 2016

(30) Foreign Application Priority Data

Feb. 18, 2015 (JP) .................................. 2015-029823

(51) Int. Cl.
*G06F 3/12* (2006.01)

(52) U.S. Cl.
CPC .......... *G06F 3/1292* (2013.01); *G06F 3/1222* (2013.01); *G06F 3/1236* (2013.01); *G06F 3/1238* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2005/0128968 A1* | 6/2005 | Yang | H04W 48/16 370/312 |
| 2015/0070725 A1* | 3/2015 | Monden | G06F 3/1232 358/1.15 |
| 2015/0153981 A1* | 6/2015 | Iwasaki | G06F 3/1238 358/1.14 |
| 2016/0150105 A1* | 5/2016 | Shinomiya | H04N 1/00307 358/1.15 |
| 2016/0170694 A1* | 6/2016 | Laurin | G06F 3/1236 358/1.15 |
| 2016/0173711 A1* | 6/2016 | Sasase | H04N 1/00307 358/1.15 |

FOREIGN PATENT DOCUMENTS

| | | | | |
|---|---|---|---|---|
| JP | 2009-298090 A | | 12/2009 | |
| JP | 2016116055 A | * | 6/2016 | ......... H04N 1/00307 |

* cited by examiner

*Primary Examiner* — Huo Long Chen
(74) *Attorney, Agent, or Firm* — Fitzpatrick, Cella, Harper & Scinto

(57) ABSTRACT

A mobile terminal receives a packet transmitted by a printing apparatus, and specifies the distance between the mobile terminal and the printing apparatus based on the received packet. The mobile terminal transmits a print instruction for print data if it is determined that the specified distance satisfies a predetermined condition.

20 Claims, 21 Drawing Sheets

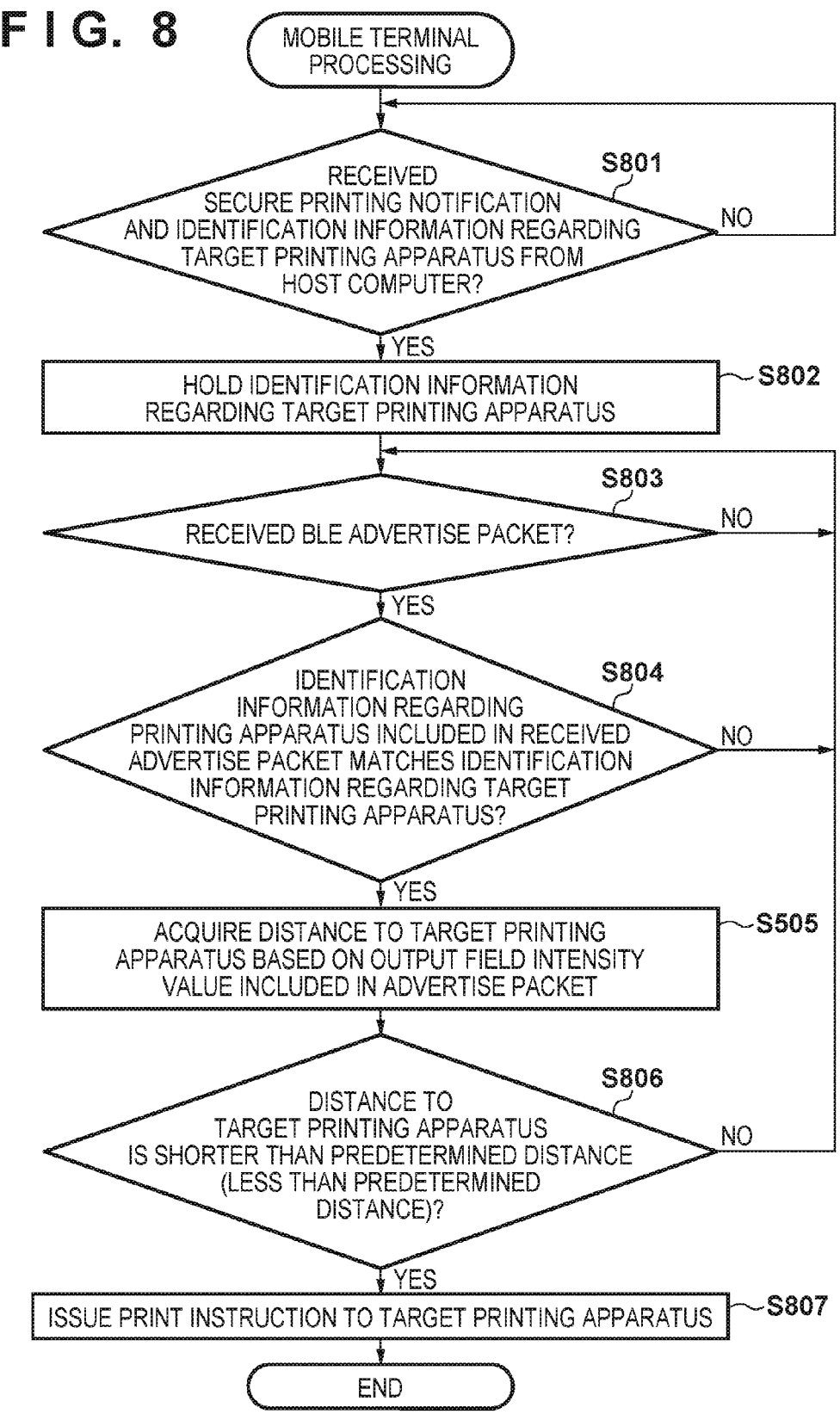

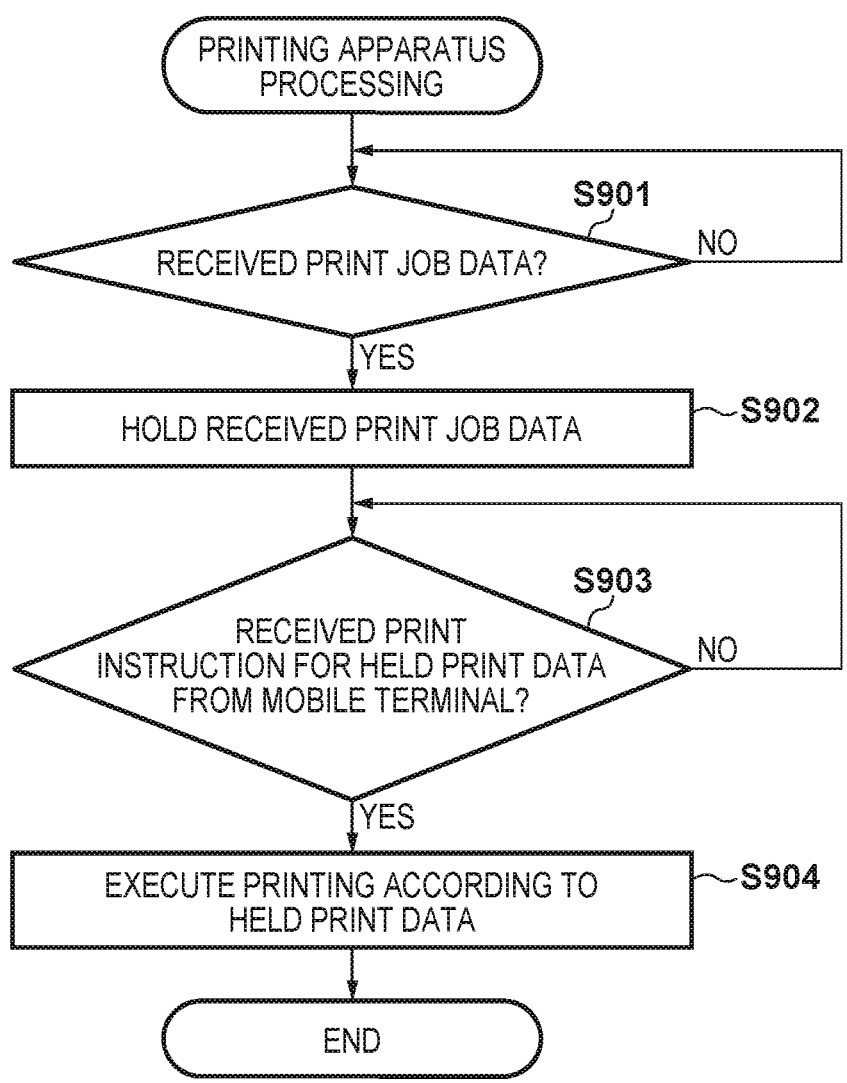

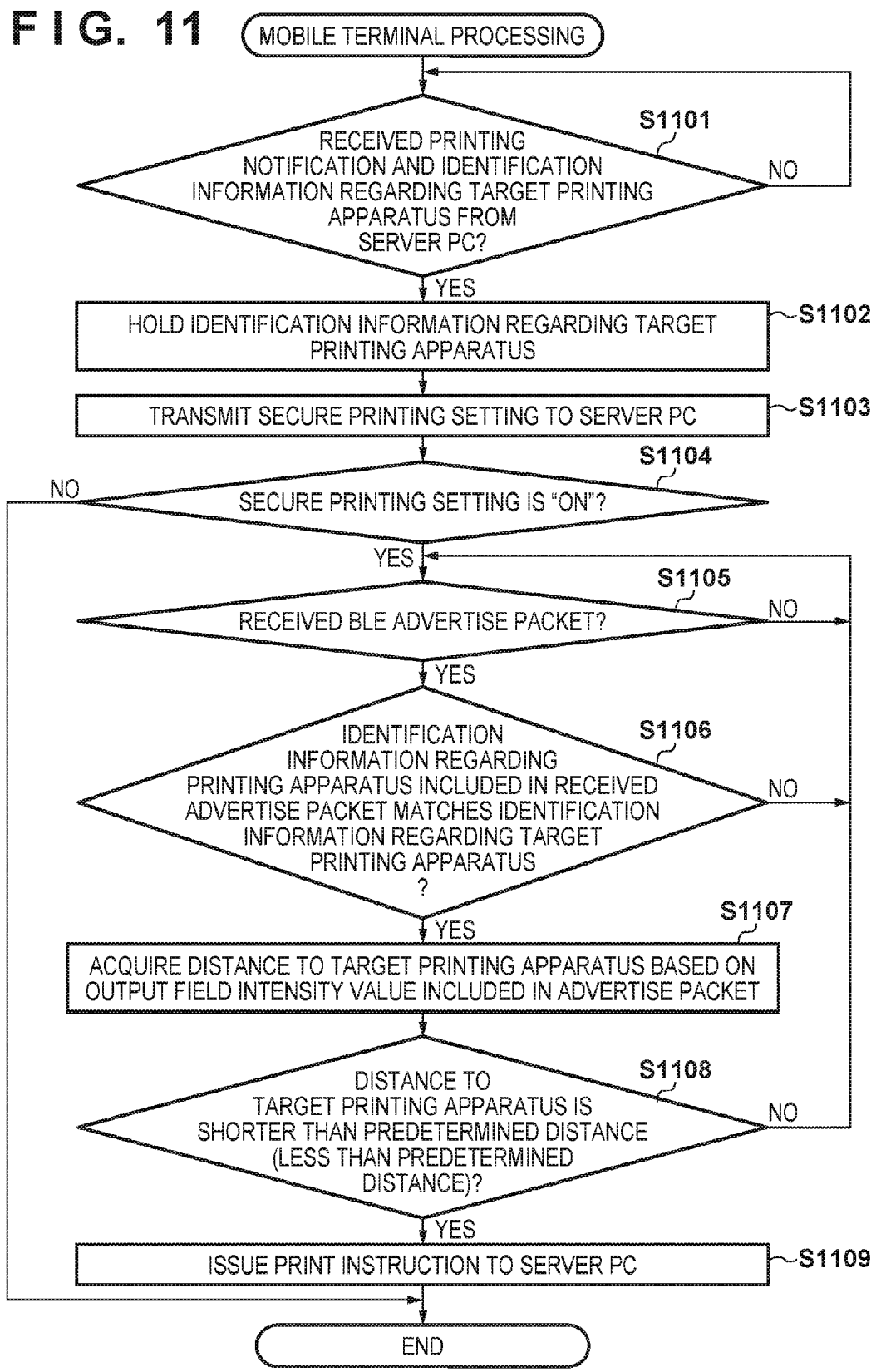

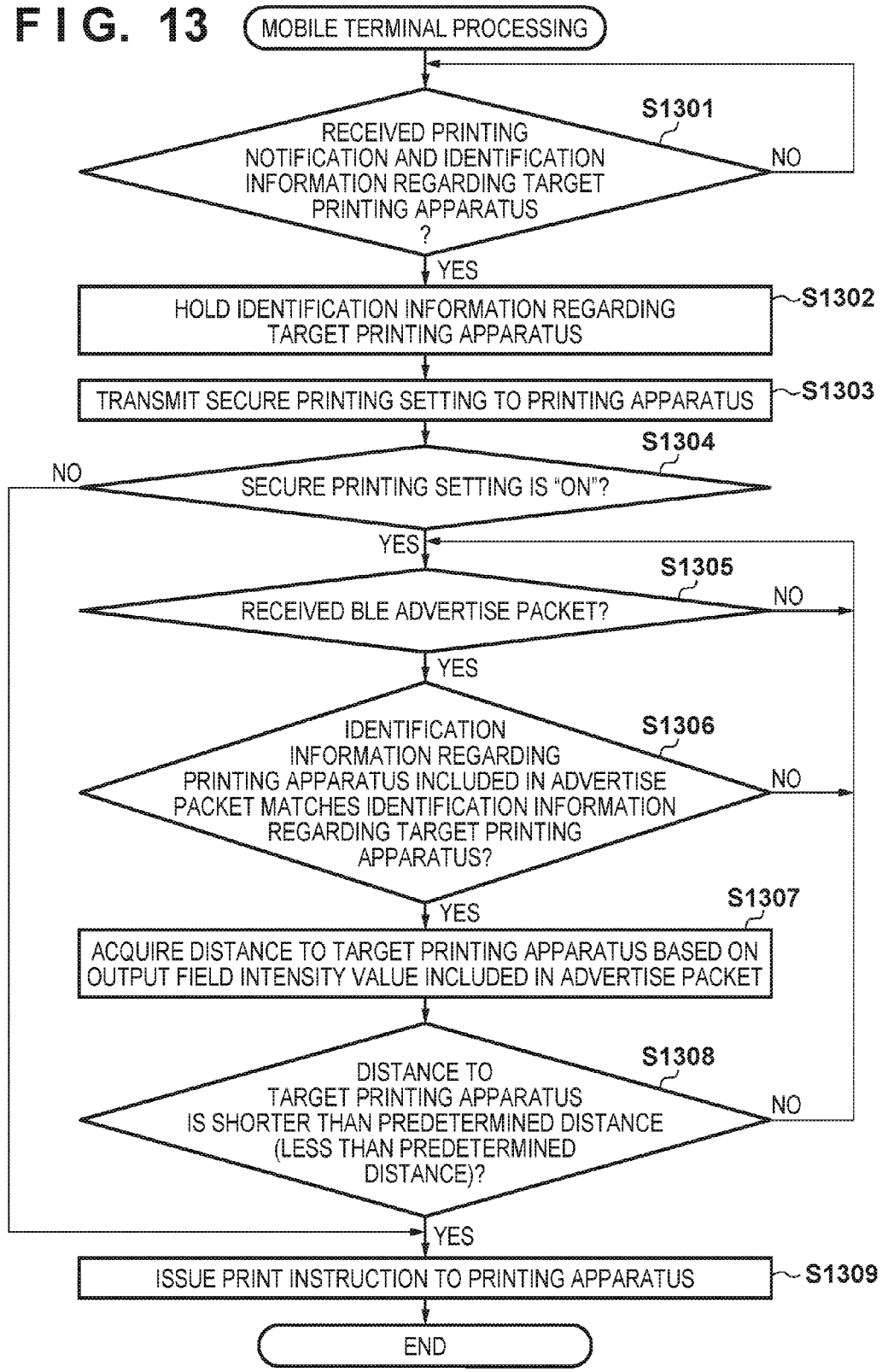

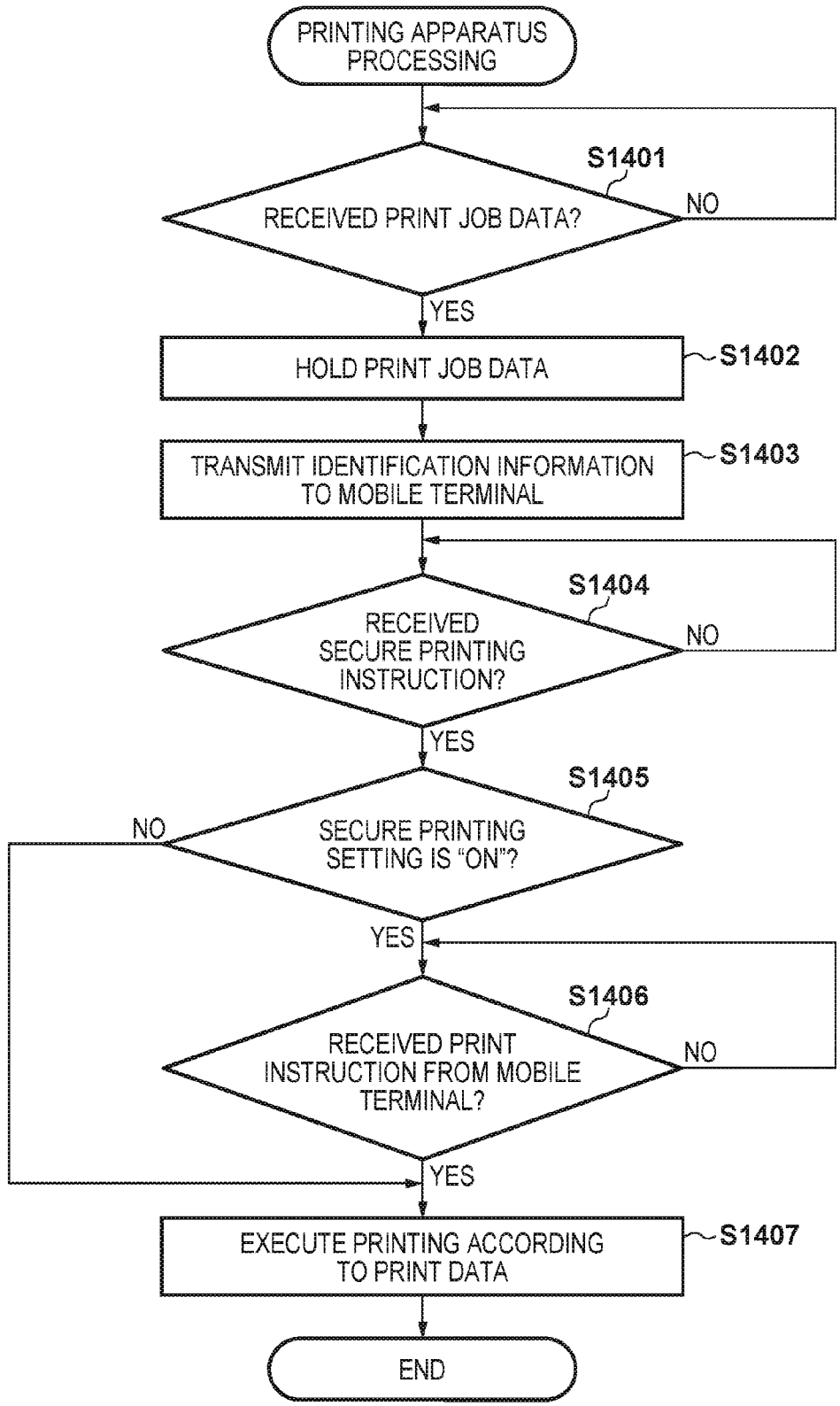

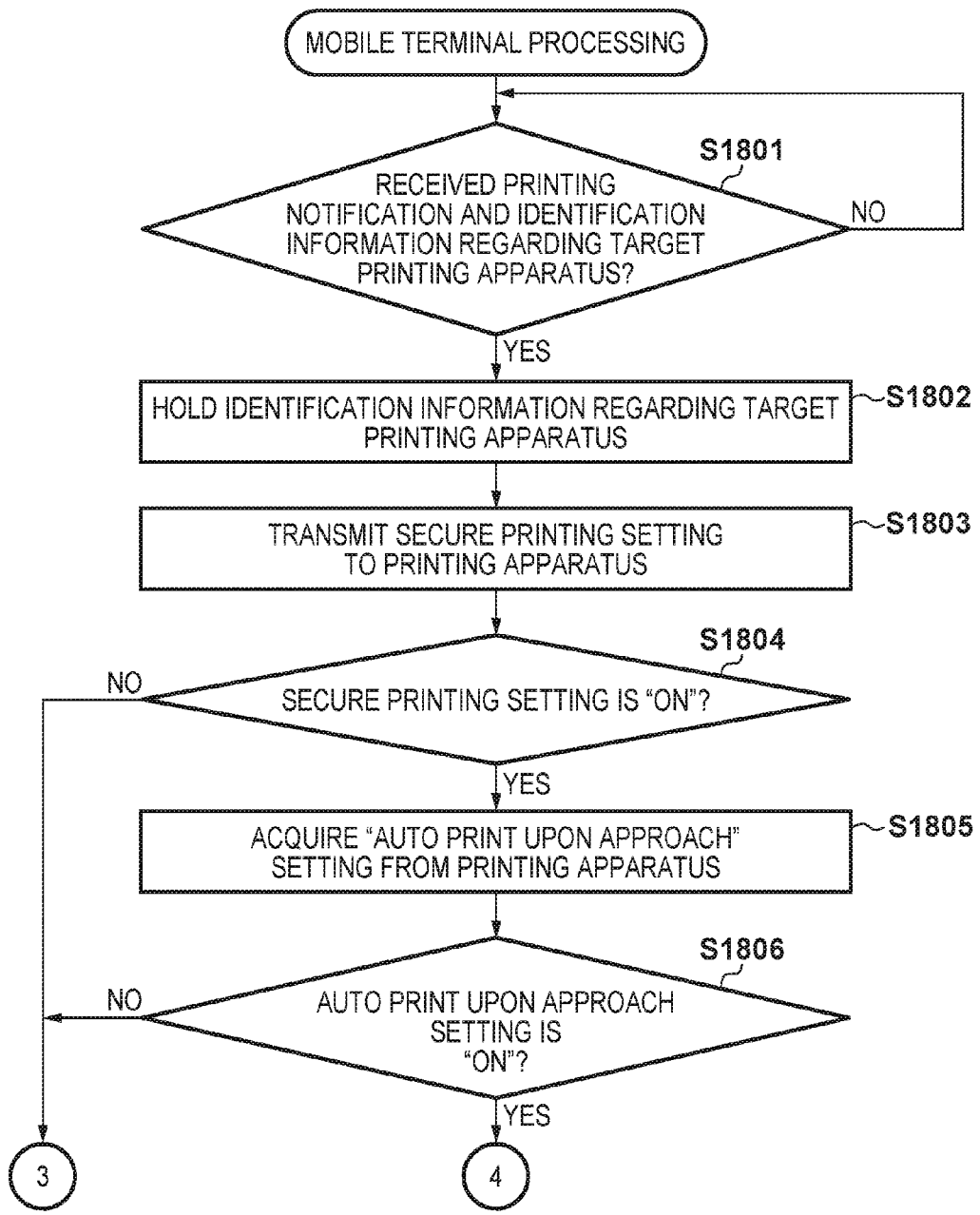

PRINTING SYSTEM, MOBILE TERMINAL, AND CONTROL METHOD

BACKGROUND OF THE INVENTION

Field of the Invention

The present invention relates to a printing system, a mobile terminal, and a control method.

Description of the Related Art

In the case where a user uses a host computer to transmit printing data to a network-connected printing apparatus for printing, if the distance from the user's position to the printing apparatus is long, a long amount of time is needed to acquire the printed document. For this reason, there are cases where another user mistakenly retrieves the printed document, or the content of the printed document is viewed by another user.

In view of this, when printing information that the user does not want other people to see, such as confidential information, there are cases where the user uses a function called locked printing (secure printing). In secure printing, print data is transmitted from the host computer to the printing apparatus, but after receiving the print data, the printing apparatus stores it rather than printing it immediately. The user then goes to the location of the printing apparatus and performs user authentication via an operation panel on the printing apparatus, whereafter it is first possible to print the stored print data that the user transmitted. For example, Japanese Patent Laid-Open No. 2009-298090 discloses a technique for realizing secure printing by user authentication performed via an operation panel.

The Bluetooth (registered trademark) standard has been extended in recent years, and the Bluetooth Low Energy (hereinafter, called "BLE") communication standard has been developed and begun to be implemented in mobile terminals and the like. Features of BLE include the ability to perform low-power communication and the ability to measure the distance between devices.

In conventional secure printing, the user needs to first move to the location of the printing apparatus and perform an operation on the operation panel such as inputting their password or scanning an IC card or the like. Also, since the user cannot execute printing unless they move to the location of the printing apparatus, even in the case of printing one page, the user needs to first go to the location of the printing apparatus and then wait until the document can be acquired.

SUMMARY OF THE INVENTION

An aspect of the present invention is to eliminate the above-mentioned problems with the conventional technology.

The present invention provides a technique for shortening the amount of time needed for printing completion by causing printing to start when a user holding a portable terminal merely approaches a printing apparatus.

The present invention in one aspect provides a printing system having a printing apparatus, a server, and a mobile terminal, the printing apparatus comprising a first transmission unit configured to transmit a packet, the server comprising a storage unit configured to store print data, and the mobile terminal comprising: a reception unit configured to receive the packet transmitted by the first transmission unit; a specification unit configured to specify a distance between the mobile terminal and the printing apparatus based on the packet received by the reception unit; a first determination unit configured to determine whether or not the distance specified by the specification unit satisfies a predetermined condition; and a second transmission unit configured to, in a case where the first determination unit determines that the distance specified by the specification unit satisfies the predetermined condition, transmit a print instruction for the print data to the server, wherein in a case where the server receives the print instruction, the server transmits the print data to the printing apparatus.

According to the present invention, printing is started when a user holding a portable terminal merely approaches the printing apparatus, thus shortening the amount of time needed for printing completion.

Further features of the present invention will become apparent from the following description of exemplary embodiments with reference to the attached drawings.

BRIEF DESCRIPTION OF THE DRAWINGS

FIG. 8 is another flowchart showing a procedure of control processing performed by the mobile control unit of the mobile terminal.

FIG. 9 is a flowchart showing a control procedure performed by a printer control unit of the printing apparatus.

FIG. 11 is another flowchart showing a procedure of control processing performed by the mobile control unit of the mobile terminal.

FIG. 13 is another flowchart showing a procedure of control processing performed by the mobile control unit of the mobile terminal.

FIG. 14 is another flowchart showing a procedure of control processing performed by the printer control unit of the printing apparatus.

FIGS. 18A and 18B are flowcharts showing a procedure of control processing performed by the mobile control unit of the mobile terminal.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Like constituent elements are denoted by like reference signs, and descriptions will not be given for them.

First Embodiment

Figure 1:
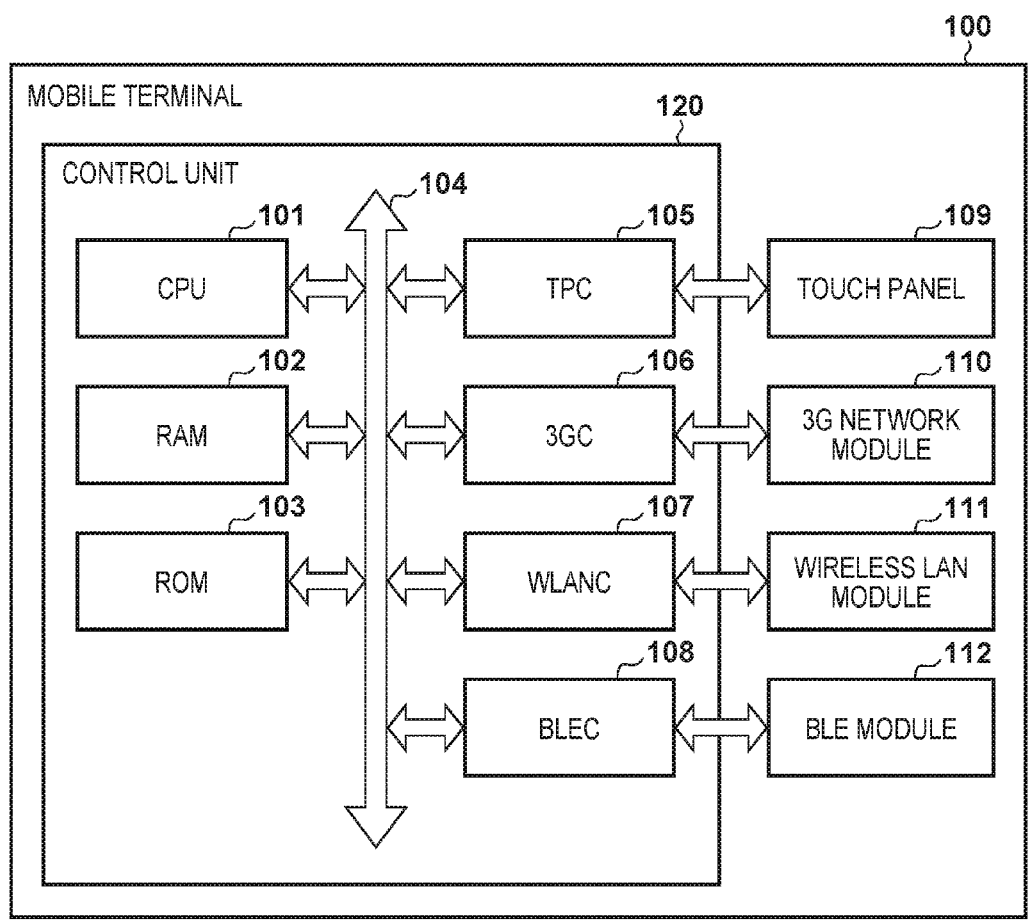
FIG. 1 is a block diagram showing a configuration of a mobile terminal (portable terminal).

FIG. 1 is a block diagram for describing the configuration of a mobile terminal (portable terminal) 100 according to a first embodiment of the present invention.

The mobile terminal 100 is a portable terminal such as a smartphone or a tablet PC. This mobile terminal 100 is controlled by a mobile control unit 120. A CPU 101 of the mobile control unit 120 executes various types of application programs such as an email client and a web browser, which are stored in a program ROM of a ROM 103, and controls operations of the mobile terminal 100. Note that print control processing shown in the flowchart of FIG. 5 according to the first embodiment is also stored as a program in the ROM 103 and is executed by the CPU 101. The CPU 101 also performs overall control of devices connected to a system bus 104. A RAM 102 functions as a main memory, a work memory, and the like for the CPU 101. A touch panel controller (TPC) 105 performs control regarding the display of screens on a touch panel 109 and touch operations. A 3G network controller (3GC) 106 controls a 3G network module 110 to enable communication over a phone network. Here, the phone communication system is not limited to a 3G network, and another communication system such as a 4G network may be used. A wireless LAN controller (WLANC) 107 controls a wireless LAN module 111 to realize wireless LAN communication, which is typified by WiFi. A BLE (Bluetooth Low Energy) controller (BLEC) 108 controls a BLE module 112 to enable BLE communication. The devices described above are connected to the system bus 104.

Figure 2:
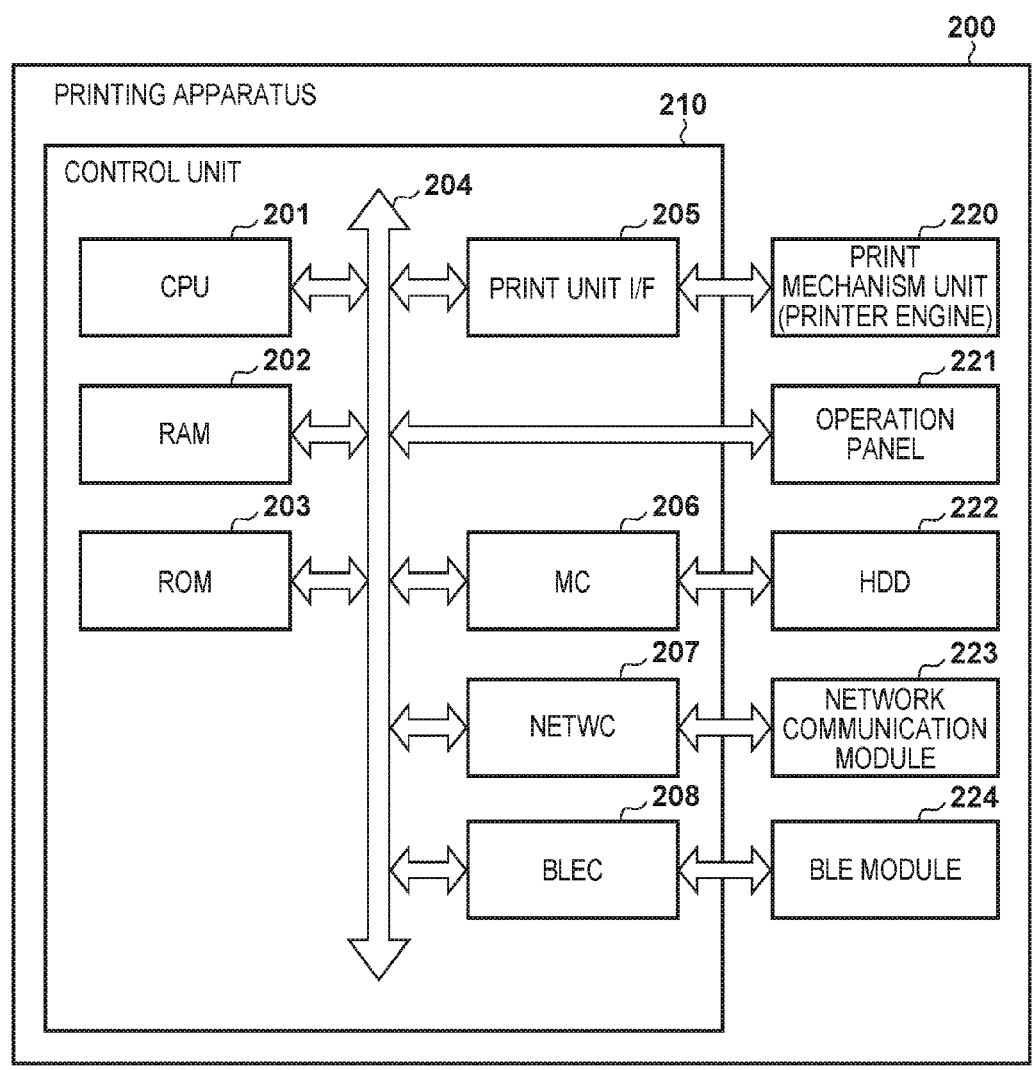
FIG. 2 is a block diagram showing a configuration of a printing apparatus.

FIG. 2 is a block diagram for describing the configuration of a printing apparatus 200 according to the first embodiment of the present invention.

The printing apparatus 200 is an electrophotographic or inkjet printer, or the like. This printing apparatus 200 is controlled by a printer control unit 210. A CPU 201 of the printer control unit 210 performs overall control of access to various types of devices connected to a system bus 204 based on a control program or the like stored in a program ROM of a ROM 203. The CPU 201 outputs an image signal as output information to a print mechanism unit (printer engine) 220 connected via a print unit interface 205. Also, functions for executing print control and periodic BLE advertise packet transmission processing according to the first embodiment are also stored as programs in the ROM 203 and executed by the CPU 201. Moreover, print control logic shown in the flowchart of FIG. 9 according to the first embodiment is also stored as a program in the ROM 203 and executed by the CPU 201. The RAM 202 functions as a main memory, work memory, and the like for the CPU 201, and the memory capacity can be extended by an optional RAM connected to an extension port (not shown). Note that the RAM 202 is used as a rendering memory for storing image data received from a host computer, a video signal ON/OFF information storage region, other work regions, and the like. An operation panel 221 includes keys for instructing the execution of various types of functions, a display unit for simple display of the status of the printing apparatus 200, and an LED or the like. A memory controller (MC) 206 controls access to a nonvolatile memory such as a hard disk (HDD) 222 that stores print data received from the host computer and the like. A network controller (NETWC) 207 controls a network communication module 223 to enable communication, via a network, with various types of devices connected to the network. Also, a BLE controller (BLEC) 208 controls a BLE module 224 to enable BLE communication (near field communication). The devices described above are connected to the system bus 204.

Figure 3:
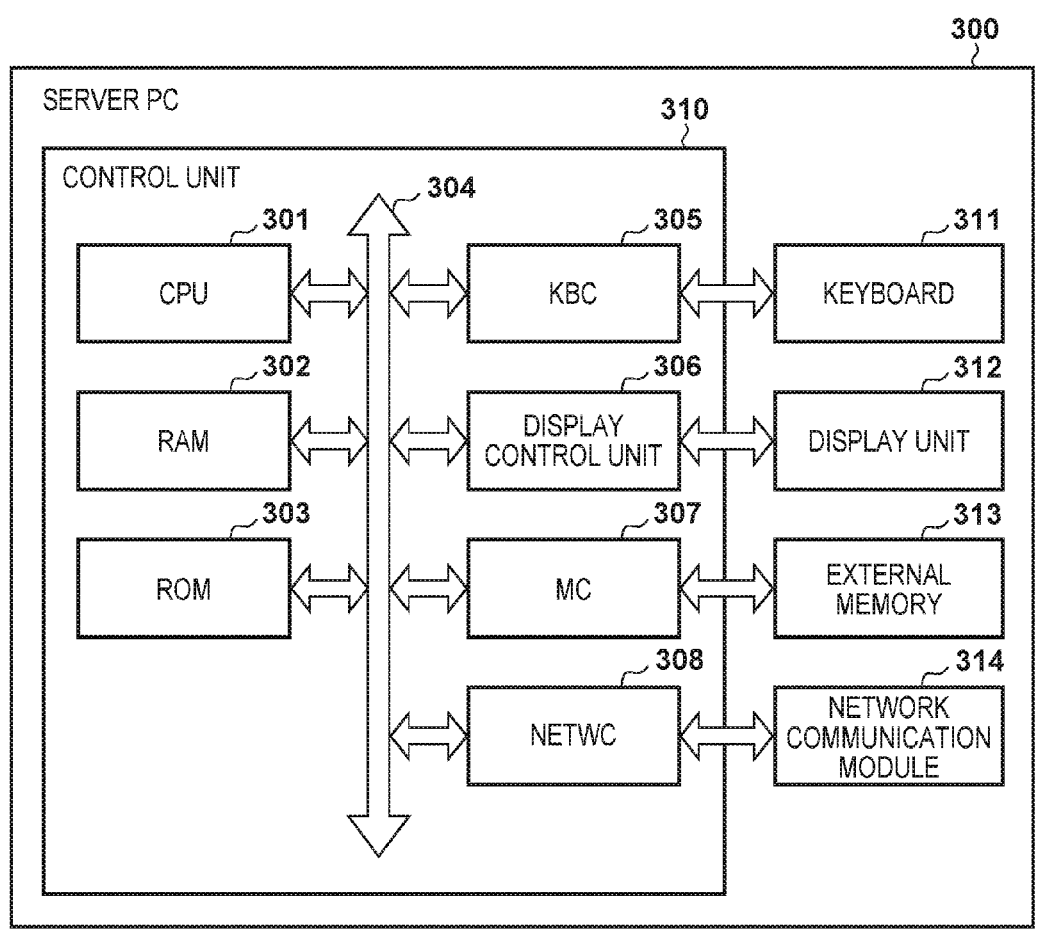
FIG. 3 is a block diagram showing a configuration of a server PC.

FIG. 3 is a block diagram for describing the configuration of a server PC 300 according to the first embodiment of the present invention.

The server PC 300 includes a server PC control unit 310 that controls the operations thereof. A CPU 301 of the server PC control unit 310 executes document processing on documents that include a mixture of graphics, images, characters, tables (including spreadsheets etc.) and the like based on a document processing program or the like stored in a program ROM of a ROM 303. The CPU 301 performs overall control of devices connected to a system bus 304. Also, a control program and the like executed by the CPU 301 are stored in the program ROM of the ROM 303, and font data and the like used when performing the document processing are stored in a font ROM of the ROM 303. Moreover, various types of data used when performing the document processing are stored in a data ROM of the ROM 303.

A RAM 302 provides a main memory, a work memory, and the like for the CPU 301, and is used for temporary storage of various types of data. A keyboard controller (KBC) 305 controls key input from a keyboard 311 or a pointing device (not shown). A display control unit 306 controls displays shown on a display unit 312. A memory controller (MC) 307 controls access to an external memory 313 such as a hard disk (HD) or a floppy (registered trademark) disk (FD) that stores a boot program, various types of applications, font data, user files, editing files, and the like. The external memory 313 also stores a program such as that shown in the flowchart of FIG. 6 according to the first embodiment. A network controller (NETWC) 308 controls a network communication module 314 to execute communication control processing for communication with other devices via a network. Note that the CPU 301 executes processing for deploying (rasterizing) an outline font to a display RAM set in the RAM 302, for example, to enable WYSIWYG on the display unit 312. The CPU 301 also opens various registered windows based on commands given using a mouse cursor or the like (not shown) on the screen of the display unit 312, and executes various types of data processing.

Note that a host computer used by a user to execute an application and instruct printing has a configuration similar to that of the server PC 300, and thus a description of the configuration will be omitted.

The following describes operations in the printing system.

Figure 4:
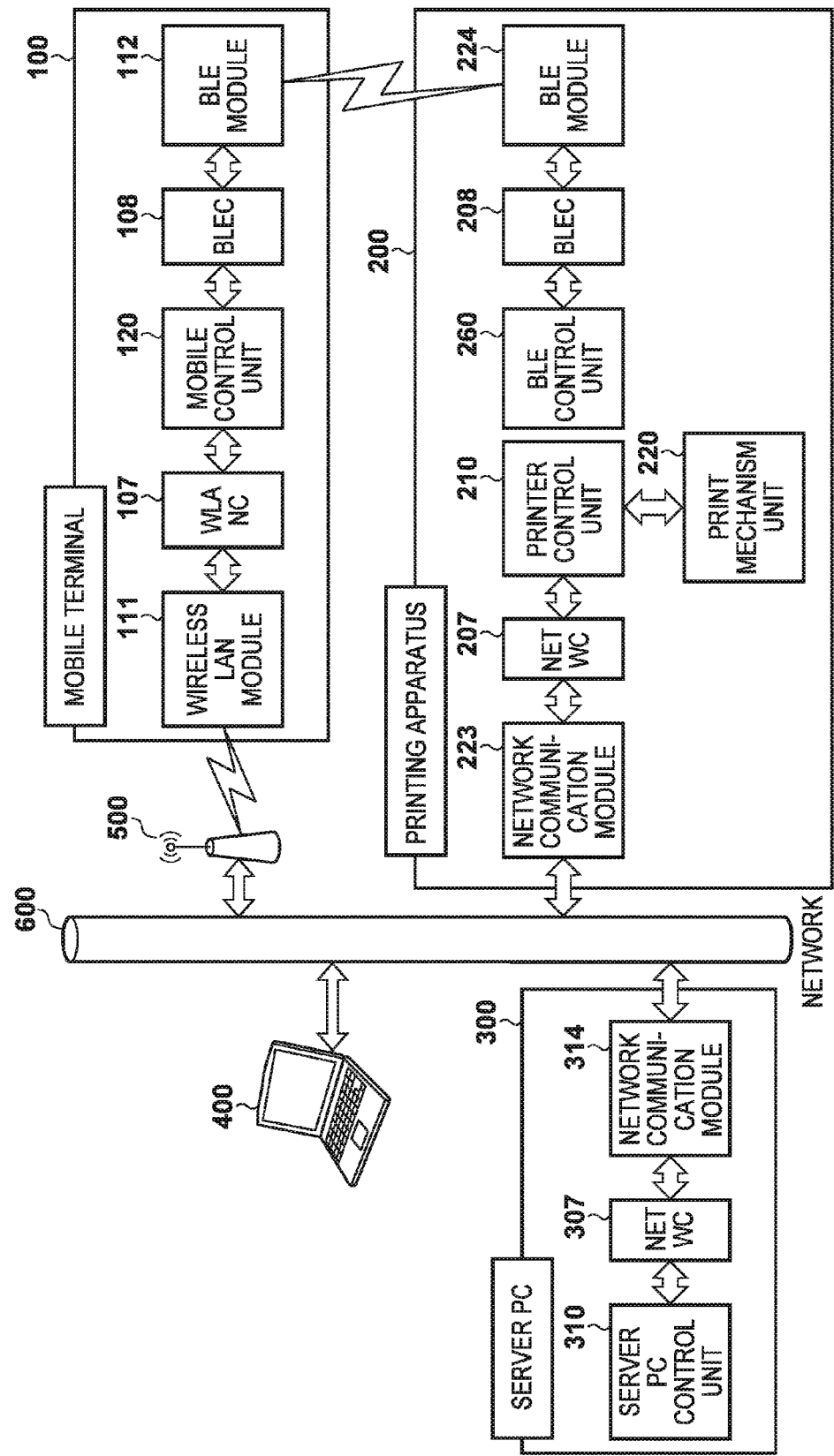
FIG. 4 is a diagram showing an overall configuration of a printing system that includes a mobile terminal, a printing apparatus, a server PC, and a host computer.

FIG. 4 is a diagram for describing the overall configuration of the printing system that includes the mobile terminal 100, the printing apparatus 200, the server PC 300, and a host computer 400 according to the first embodiment.

FIG. 4 also shows a software configuration for locked printing (secure printing) that employs BLE communication in the CPU 101 of the mobile terminal 100, the CPU 201 of the printing apparatus 200, and the CPU 301 of the server PC 300. Note that portions that are the same as configurations in FIGS. 1 to 3 are denoted by the same reference signs, and descriptions will not be given for them. Next, the first embodiment will be described with reference to FIG. 4.

When the host computer 400 is operated by the user, print data is transmitted from the host computer 400 to the server PC 300 via a network 600. Specifically, the user executes an application for document processing or the like on the host computer 400 to designate the target printing apparatus 200 and mobile terminal information regarding the user's mobile terminal and instruct the printing of created data. When printing is instructed from the application in this way, a printer driver installed in the host computer 400 converts the data into page description language data or bitmap data and generates print job data such as that shown in FIG. 7. At this time, the printer driver also generates identification information regarding the mobile terminal 100 and identification information regarding the target printing apparatus 200, and transmits the print job data, which is a collection of the three pieces of data above, to the server PC 300.

Figure 7:
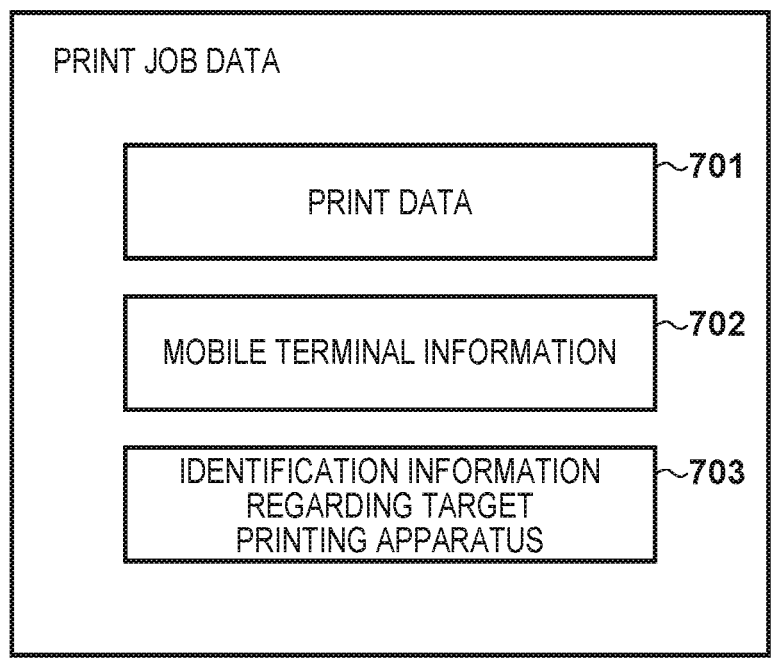
FIG. 7 is a diagram showing a configuration of print job data transmitted from the host computer to the server PC.

FIG. 7 is a diagram for describing the configuration of print job data transmitted from the host computer 400 to the server PC 300 according to the first embodiment.

This print job data includes print data 701 that includes page description language data, bitmap data, or the like, as well as mobile terminal information 702 that is identification information regarding the mobile terminal 100, and identification information 703 regarding the printing apparatus 200.

The server PC 300 receives the print job data transmitted from the host computer 400 via the network 600, and passes the print job data to the server PC control unit 310 via the network communication module 314 and the network controller (NETWC) 308. The server PC control unit 310 then analyzes the print job data. If the print job data includes the mobile terminal information 702, it is determined that secure printing has been instructed, and the printing of the print data is put on hold and the print data is maintained in a stored state until a print instruction is received from the mobile terminal 100 designated in the print job data. Note that a specific secure printing control procedure performed by the server PC 300 will be described later with reference to the flowchart of FIG. 6.

Next, the printing apparatus 200 will be described.

The printing apparatus 200 is connected to the network 600 and passes the print data transmitted from the server PC 300 to the printer control unit 210 via the network communication module 223 and the network controller (NETWC) 207 of the printing apparatus 200. The printer control unit 210 controls the print mechanism unit 220 to output the print data as a video signal and execute printing. A BLE communication control unit 260 generates a BLE advertise packet that includes an output field intensity value necessary for the mobile terminal 100 to acquire the distance to the printing apparatus 200. The BLE communication control unit 260 transmits the BLE advertise packet via the BLE controller (BLEC) 208 and the BLE module 224 at a constant time interval. There are no particular limitations on the interval of the transmission of the BLE advertise packet, and it may be any value.

Next, the mobile terminal 100 will be described.

In order to be connected to the network by a wireless LAN, the mobile terminal 100 is connected to the network 600 via a wireless LAN access point 500. Upon determining that the printing apparatus 200 is closer than a predetermined distance, the mobile control unit 120 instructs the server PC 300 to transmit the print data held by the server PC 300 to the printing apparatus 200. Note that the control procedure performed by the mobile control unit 120 according to the first embodiment will be described later with reference to the flowchart of FIG. 5.

Note that although the printing apparatus 200, the server PC 300, and the host computer 400 are connected to the network 600 that is a wired LAN in the first embodiment, the present invention is not limited in this way, and another connection method such as a wireless LAN may be used.

Next, the control procedure performed by the mobile terminal 100 according to the first embodiment will be described with reference to the flowchart of FIG. 5.

Figure 5:
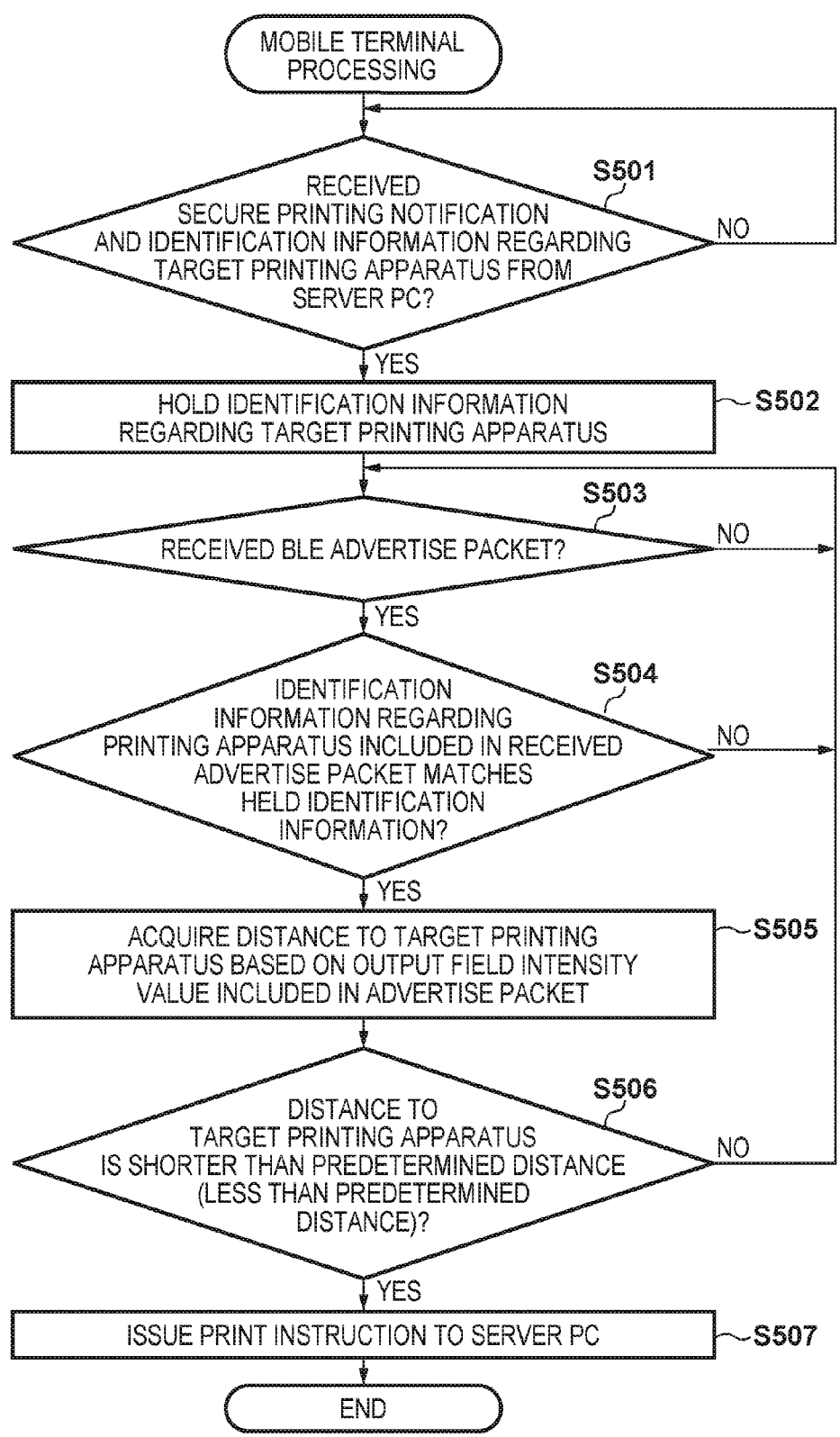
FIG. 5 is a flowchart showing a procedure of control processing performed by a mobile control unit of the mobile terminal.

FIG. 5 is a flowchart for describing a procedure of control processing performed by the mobile control unit 120 of the mobile terminal 100 according to the first embodiment. A program for executing this processing is stored in the program ROM of the ROM 103, and the processing shown in this flowchart is realized by the CPU 101 executing the stored program.

First, in step S501, the CPU 101 waits until data regarding a print job (print job data) for performing secure printing is received from the server PC 300. Specifically, the CPU 101 waits for the reception of a notification indicating that secure printing according to the first embodiment was instructed, and identification information regarding the target printing apparatus 200 that is to execute printing. When print job data for performing secure printing is received in step S501, the procedure proceeds to step S502, in which the CPU 101 holds the received identification information regarding the target printing apparatus in the RAM 102. Next, the procedure proceeds to step S503, in which the CPU 101 waits for the reception of a BLE advertise packet. When a BLE advertise packet is received in step S503, the procedure proceeds to step S504, in which the CPU 101 determines whether or not the received BLE advertise packet was transmitted from the target printing apparatus indicated by the printing apparatus identification information that was stored in step S502. If it is determined in step S504 that the received BLE advertise packet was not transmitted from the target printing apparatus, the procedure returns to step S503, and the CPU 101 again waits for the reception of a BLE advertise packet.

On the other hand, if the CPU 101 determines in step S504 that the received BLE advertise packet was transmitted from the target printing apparatus, the procedure proceeds to step S505. In step S505, the CPU 101 obtains the distance between the mobile terminal 100 and the target printing apparatus 200 based on an output field intensity value included in the BLE advertise packet. The procedure then proceeds to step S506, in which the CPU 101 determines whether or not the obtained distance is shorter than a predetermined distance, that is to say, whether or not the user in possession of the mobile terminal 100 has moved to a position within a predetermined distance range from the printing apparatus 200. Here, if the CPU 101 determines that the user has not moved to a position closer than the predetermined distance, the procedure returns to step S503, and the CPU 101 again waits for the reception of a BLE advertise packet. On the other hand, if the CPU 101 determines in step S506 that the user has moved to a position closer than the predetermined distance to the target printing apparatus 200, the procedure proceeds to step S507, in which the CPU 101 issues, to the server PC 300, a print instruction for starting the printing of the print data being held, and then ends this processing.

In this way, by the user holding the mobile terminal 100 merely approaching the target printing apparatus 200 that is to be used for printing, a print instruction is automatically issued from the mobile terminal 100 to the server PC 300 holding the print data. Accordingly, it is possible to shorten the amount of time required for printing to begin compared to the case where the user needs to first arrive at the location of the printing apparatus 200 and then operate the printing apparatus to instruct the start of printing. Although it depends on the amount of print data, there is a higher possibility of the desired printing being completed by the time the user arrives at the location of the printing apparatus 200, and there is also an effect of being able to reduce the amount of time spent waiting for printing.

Next, the processing procedure performed by the server PC 300 according to the first embodiment will be described with reference to the flowchart of FIG. 6.

Figure 6:
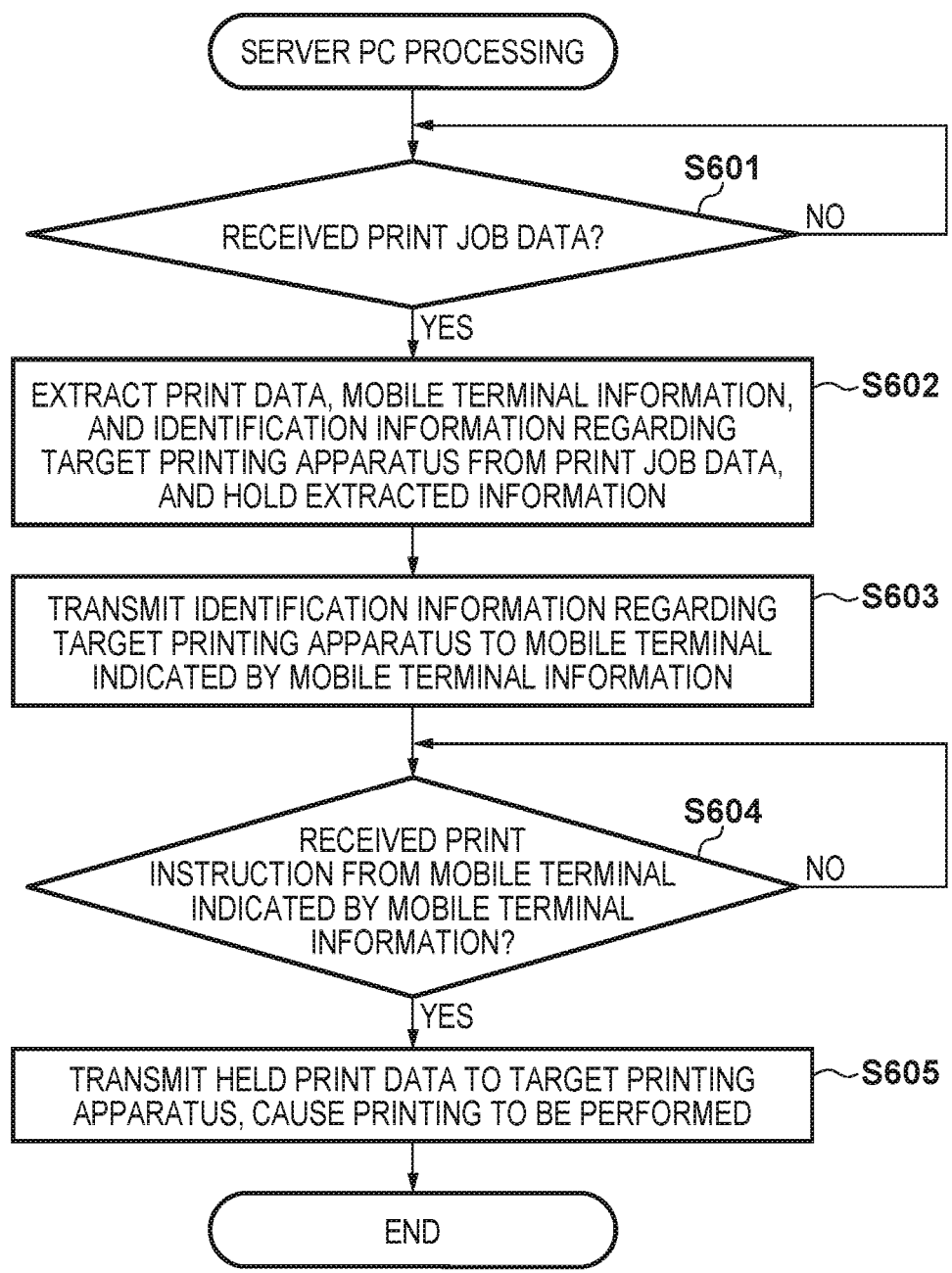
FIG. 6 is a flowchart showing a control procedure performed by a control unit of the server PC.

FIG. 6 is a flowchart for describing a control procedure performed by the server PC control unit 310 of the server PC 300 according to the first embodiment. A program for executing this processing is stored in the program ROM of the ROM 303, and the processing shown in this flowchart is realized by the CPU 301 executing the stored program.

First, in step S601, the CPU 301 waits for the reception of print job data (e.g., see FIG. 7) from the host computer 400. When print job data is received, the procedure proceeds to step S602, in which the CPU 301 extracts the print data 701, the mobile terminal information 702, and the printing apparatus identification information 703 from the print job data, and stores these information pieces in the RAM 302. Next, the procedure proceeds to step S603, in which the CPU 301 transmits, to the mobile terminal 100 indicated by the mobile terminal information 702 that was stored in the RAM 302 in step S602, a secure printing notification and identification information regarding the target printing apparatus 200 that is to be used for printing. Next, the procedure proceeds to step S604, in which the CPU 301 waits for the reception of a print instruction from the mobile terminal 100 indicated by the mobile terminal information 702 that was stored in the RAM 302 in step S602. When the print instruction is received in step S604, the procedure proceeds to step S605, in which the CPU 301 transmits the print data 701 held in the RAM 302 to the target printing apparatus 200 indicated by the printing apparatus identification information 703 for printing. Note that here, there are no particular limitations on the distance setting that is the condition for issuing the print instruction, and any value may be used. For example, the user may be able to, via a screen in the printer driver of the host computer 400, set the distance (e.g., 10 m) up to which the mobile terminal 100 held by the user needs to approach the target printing apparatus in order to issue the print instruction.

As described above, according to the first embodiment, the user uses the host computer 400 to designate the target printing apparatus that is to be used for printing, and to instruct secure printing. The user can then cause that printing to be executed by merely holding the mobile terminal and approaching the target printing apparatus. Accordingly, the user can cause printing to be executed without performing a user authentication operation on the printing apparatus. Also, printing by the printing apparatus is started during the user's approach to the printing apparatus, thus having an effect of making it possible to shorten the amount of time spent waiting for printing completion.

Second Embodiment

In the first embodiment described above, the host computer 400 transmits print job data for printing in secure printing to the printing apparatus 200 via the server PC 300. In contrast, in a second embodiment, the host computer 400 directly transmits print job data to the printing apparatus 200, and the printing apparatus 200 stores the data. The following describes an example in which the execution of the stored print job is started by a print instruction from the mobile terminal 100 held by the user. Note that the configuration of the printing system according to the second embodiment is basically the same as that shown in FIG. 4, but is different in that the server PC 300 is not necessary. Another difference from the first embodiment described above is that the host computer 400 of the second embodiment transmits print job data to the printing apparatus 200, and transmits identification information regarding the target printing apparatus that is to perform printing to the mobile terminal 100. Note that the identification information regarding the target printing apparatus that is to perform printing may be transmitted to the mobile terminal 100 by either the host computer 400 or the printing apparatus.

The following describes control procedures performed by the mobile control unit 120 of the mobile terminal 100 and the printer control unit 210 of the printing apparatus 200 according to the second embodiment of the present invention with reference to flowcharts.

FIG. 8 is a flowchart for describing a procedure of control processing performed by the mobile control unit 120 of the mobile terminal 100 according to the second embodiment. A program for executing this processing is stored in the program ROM of the ROM 103, and the processing shown in this flowchart is realized by the CPU 101 executing the stored program.

First, in step S801, the CPU 101 waits for the reception of print job data that includes a secure printing notification and identification information regarding the target printing apparatus to be used for printing, from the host computer 400. When the CPU 101 receives the print job data in step S801, the procedure proceeds to step S802, in which the CPU 101 stores the identification information regarding the target printing apparatus in the RAM 102. The processing of the subsequent steps S803 to S806 is the same as the above-described processing of steps S503 to S506 in FIG. 5, and therefore will not be described here.

If the CPU 101 determines in step S806 that the distance to the target printing apparatus 200 is less than the predetermined distance, the procedure proceeds to step S807, in which the CPU 101 issues a print instruction to the target printing apparatus 200.

In this way, in the second embodiment, the printing apparatus 200 directly receives the print job data from the host computer 400 and holds it, and therefore the mobile terminal 100 issues the print instruction to the printing apparatus 200.

FIG. 9 is a flowchart for describing a control procedure performed by the printer control unit 210 of the printing apparatus 100 according to the second embodiment. Note that a program for executing this processing is stored in the program ROM of the ROM 203, and the processing shown in this flowchart is realized by the CPU 201 reading out and executing the stored program.

First, in step S901, the CPU 201 waits for the reception of print job data instructing secure printing from the host computer 400. When the print job data is received, the procedure proceeds to step S902, in which the CPU 201 stores the received print job data in the RAM 202. Next, the procedure proceeds to step S903, in which the CPU 201 waits for an instruction to execute the stored print job to be issued from the mobile terminal 100. When the print instruction is received, the procedure proceeds to step S904, in which the CPU 201 executes printing according to the print data in the stored print job data.

Note that the host computer 400 transmits printing apparatus identification information to the mobile terminal 100 in the example described above. However, in the case where the printing apparatus 200 transmits printing apparatus identification information to the mobile terminal 100, it is sufficient that in step S902, the CPU 201 transmits the printing apparatus identification information 703 included in the print job data to the mobile terminal that corresponds to the mobile terminal information 702.

As described above, according to the second embodiment, secure printing equivalent to that in the first embodiment can be realized even if print job data is directly received by the printing apparatus 200 and held rather than be held in the server PC 300. In other words, similarly to the first embodiment described above, the user uses the host computer 400 to designate the target printing apparatus that is to perform printing, and to give a secure printing instruction. The user can then cause that printing to be executed by merely holding the mobile terminal and approaching the target printing apparatus. Also, printing by the printing apparatus is started during the user's approach to the printing apparatus, thus having an effect of making it possible to shorten the amount of time spent waiting for printing completion.

Third Embodiment

In the first and second embodiments, secure printing is executed unconditionally. In contrast, a third embodiment of the present invention describes an example in which "ON" or "OFF" can be selected for secure printing via a setting screen on the mobile terminal 100. Note that the configuration of the printing system according to the third embodiment is basically the same as that of the first embodiment described above, and therefore will not be described here.

Figure 10A:
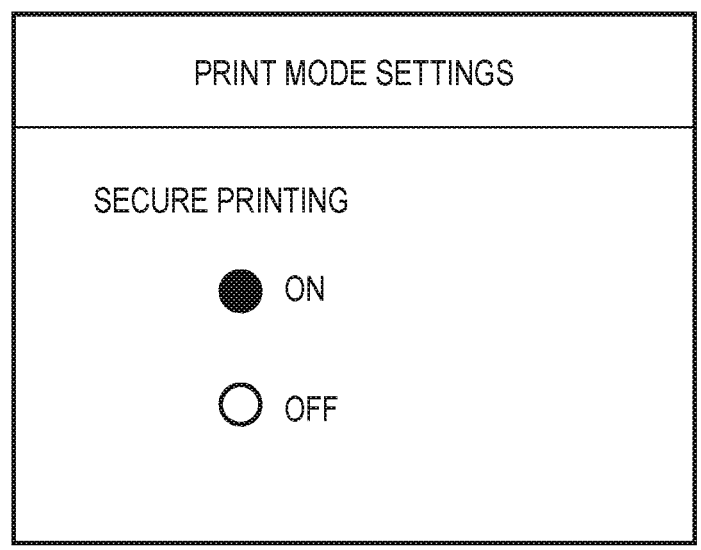
FIG. 10A is a diagram showing a print mode setting screen displayed on a touch panel of the mobile terminal.

FIG. 10A is a diagram showing an example of a print mode setting screen displayed on the touch panel 109 of the mobile terminal 100 according to the third embodiment.

Here, the user can select, via this setting screen, whether or not to use the secure printing function. In the example shown in FIG. 10A, "ON" is selected, which instructs the use of the secure printing function.

The following describes a control procedure performed by the mobile control unit 120 of the mobile terminal 100 according to the third embodiment with reference to a flowchart.

FIG. 11 is a flowchart for describing control processing performed by the mobile control unit 120 of the mobile terminal 100 according to the third embodiment. A program for executing this processing is stored in the program ROM of the ROM 103, and the processing shown in this flowchart is realized by the CPU 101 executing the stored program.

First, in step S1101, the CPU 101 waits for the reception of a print instruction and identification information regarding the target printing apparatus to be used for printing, from the server PC 300. When the CPU 101 receives the identification information regarding the target printing apparatus in step S1201, the procedure proceeds to step S1102, in which the CPU 101 stores the received identification information regarding the target printing apparatus in the RAM 102. Next, the procedure proceeds to step S1103, in which the CPU 101 acquires the secure printing setting that was made via the print mode setting screen in FIG. 10A, and transmits the setting to the server PC 300.

Next, the procedure proceeds to step S1104, in which the CPU 101 determines whether "ON" has been set for secure printing in the screen shown in FIG. 10A, and if "ON" has not been set, that is to say if "OFF" has been set, the CPU 101 ends this processing without performing anything. Note that in this case, the server PC 300 determines in step S1205 of FIG. 12 that "OFF" has been set for secure printing, and immediately transmits the held print data to the printing apparatus 200 for printing.

On the other hand, if the CPU 101 determines in step S1104 that "ON" has been set for secure printing, the procedure proceeds to step S1105, in which the CPU 101 waits for the reception of a BLE advertise packet. When a BLE advertise packet is received in step S1105, the procedure proceeds to step S1106, in which the CPU 101 determines whether or not the printing apparatus identification information included in the received BLE advertise packet matches the identification information regarding the target printing apparatus. If the included printing apparatus identification information does not match the identification information regarding the target printing apparatus, the procedure proceeds to step S1105, in which the CPU 101 again waits for the reception of a BLE advertise packet. However, if the CPU 101 determines in step S1106 that the BLE advertise packet is a packet received from the target printing apparatus, the procedure proceeds to step S1107. In step S1107, the CPU 101 obtains the distance to the target printing apparatus based on the output field intensity value included in the advertise packet. The procedure then proceeds to step S1108, in which the CPU 101 determines whether or not the distance to the target printing apparatus 200, which was acquired in step S1107, is shorter than the predetermined distance, that is to say, whether or not the user has moved to a position closer than the predetermined distance to the target printing apparatus 200. If it is determined in step S1108 that the distance to the target printing apparatus is the predetermined distance or more, the procedure returns to step S1105, and the CPU 101 again waits for the reception of a BLE advertise packet. However, if it is determined that the distance to the target printing apparatus 200 is less than the predetermined distance, the procedure proceeds to step S1109, in which the CPU 101 issues, to the server PC 300, a print instruction for executing printing using the held print data.

As described above, according to the third embodiment, by making it possible to use the mobile terminal 100 to select whether or not secure printing is to be executed, it is possible to select whether to execute secure printing or immediately execute printing.

Figure 12:
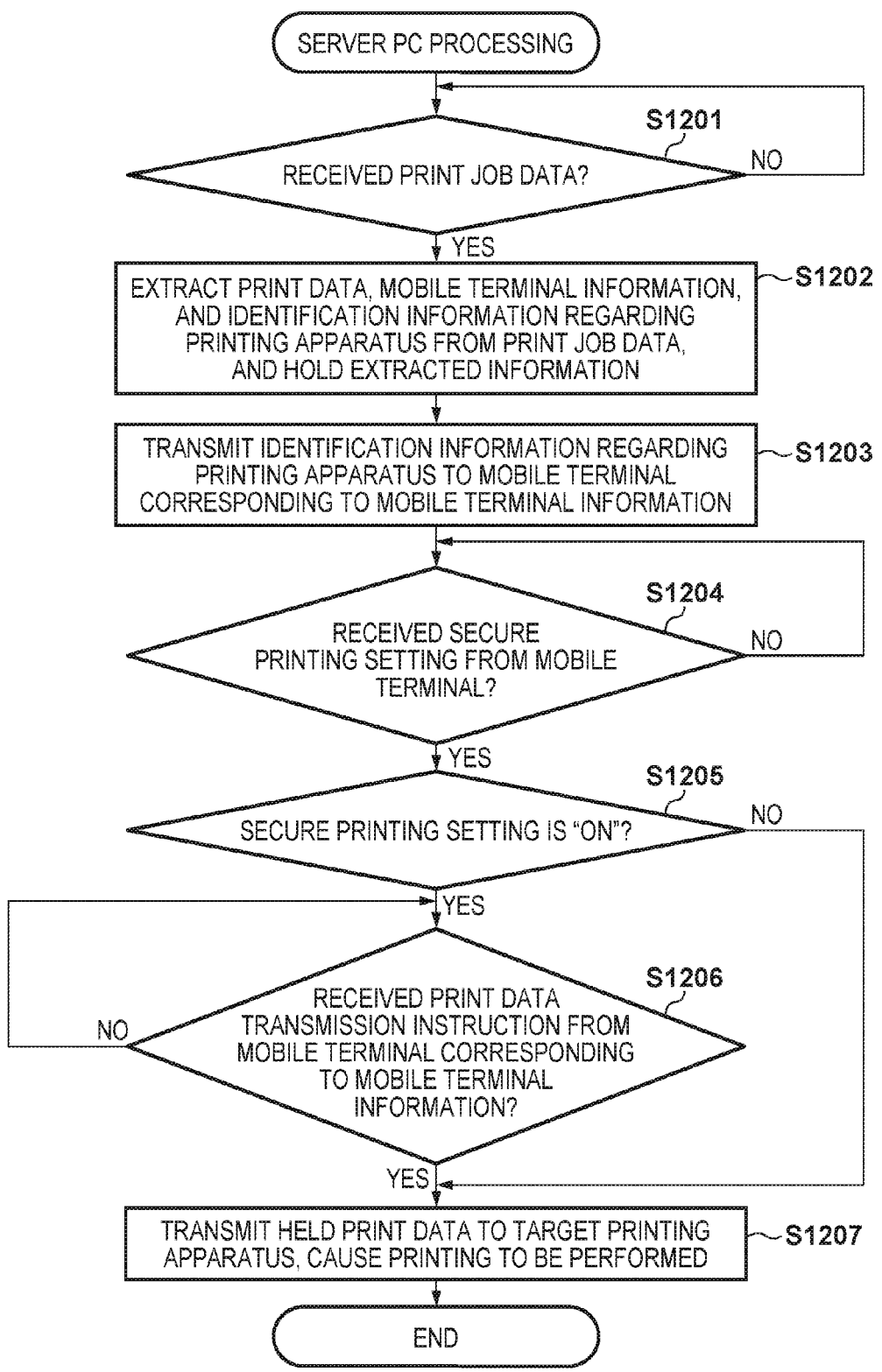
FIG. 12 is another flowchart showing a procedure of control processing performed by the control unit of the server PC.

FIG. 12 is a flowchart for describing control processing performed by the server PC control unit 310 of the server PC 300 according to the third embodiment. A program for executing this processing is stored in the program ROM of the ROM 303, and the processing shown in this flowchart is realized by the CPU 301 executing the stored program.

First, in step S1201, the CPU 301 waits for the reception of print job data (e.g., see FIG. 7) from the host computer 400. When the print job data is received, the procedure proceeds to step S1202, in which the CPU 301 extracts the print data 701, the mobile terminal information 702, and the printing apparatus identification information 703 from the print job data, and stores these information pieces in the RAM 302. Next, the procedure proceeds to step S1203, in which the CPU 301 transmits, to the mobile terminal 100 that corresponds to the held mobile terminal information 702, a print execution notification and identification information regarding the target printing apparatus to be used for printing. Next, the procedure proceeds to step S1204, in which the CPU 301 waits for the reception of a secure printing setting value (ON/OFF) from the mobile terminal 100. When this setting value is received, the procedure proceeds to step S1205, in which the CPU 301 determines whether or not the secure printing setting is "ON". Here, if it is determined that the secure printing setting is not "ON", that is to say, secure printing is not to be performed, the procedure proceeds to step S1207, in which the CPU 301 transmits the print data held in the server PC 300 to the target printing apparatus and causes the target printing apparatus to execute printing, and then ends this processing.

However, if the CPU 301 determines in step S1205 that the secure printing setting value is "ON", the procedure proceeds to step S1206, in which the CPU 301 waits for the reception of a print data transmission instruction from the mobile terminal 100 that corresponds to the mobile terminal information 702. Then, when the print data transmission instruction is received from the mobile terminal 100 in step S1206, the procedure proceeds to step S1207, in which the CPU 301 transmits the print data held in the server PC 300 to the target printing apparatus and causes the target printing apparatus to execute printing.

Note that in this case, the printing apparatus 100 executes print processing that is based on the print data received from the server PC 300.

Next, as a variation of third embodiment, the following describes an example in which in the case of transmitting print job data from the host computer 400 to the printing apparatus 200 and then performing printing, it is possible to select "ON" or "OFF" for secure printing via a setting screen on the mobile terminal 100 as described above.

FIG. 13 is a flowchart for describing a control procedure performed by the mobile control unit 120 of the mobile terminal 100 according to this variation of the third embodiment. A program for executing this processing is stored in the program ROM of the ROM 103, and the processing shown in this flowchart is realized by the CPU 101 executing the stored program. In this case as well, the above-described system configuration and the like are the same as that in the first embodiment described above, and therefore will not be described here.

First, in step S1301, the CPU 101 waits for the reception of a print notification and identification information regarding the target printing apparatus 200 that is to execute printing from the host computer 400 or the printing apparatus 200. When these data pieces are received, the procedure proceeds to step S1302, in which the CPU 101 stores the identification information regarding the target printing apparatus, which is included in the received data, in the RAM 102. Next, the procedure proceeds to step S1303, in which the CPU 101 acquires the secure printing setting value that was set via the print mode setting screen in FIG. 10A, and transmits the setting to the printing apparatus 200. Next, the procedure proceeds to step S1304, in which the CPU 101 checks the secure printing setting value that was acquired in step S1203, and if "OFF" has been set for secure printing, the procedure proceeds to step S1309, in which the CPU 101 issues a print instruction to the printing apparatus 200 to start printing.

However, if it is determined in step S1304 that "ON" has been set for secure printing, the procedure proceeds to step S1305, in which the CPU 101 waits for the reception of a BLE advertise packet. When the CPU 101 receives a BLE advertise packet in step S1305, the procedure proceeds to step S1306. In step S1306, the CPU 101 determines whether or not the received BLE advertise packet includes identification information regarding the target printing apparatus, that is to say, whether or not the BLE advertise packet was transmitted from the target printing apparatus 200. If the BLE advertise packet was not transmitted from the target printing apparatus, the procedure returns to step S1305, and the CPU 101 again waits for the reception of a BLE advertise packet.

However, if the CPU 101 determines in step S1306 that the received BLE advertise packet was transmitted from the target printing apparatus 200, the procedure proceeds to step S1307. In step S1307, the CPU 101 obtains the distance to the target printing apparatus based on the output field intensity value included in the advertise packet. Next, the procedure proceeds to step S1308, in which the CPU 101 determines whether or not the distance to the target printing apparatus is shorter than the predetermined distance, that is to say, whether or not the user holding the mobile terminal 100 has moved to a position closer than the predetermined distance to the target printing apparatus. If it is determined that the distance to the target printing apparatus is greater than or equal to the predetermined distance, the procedure returns to the step S1305, and the CPU 101 again waits for the reception of a BLE advertise packet. However, if it is determined that the distance between the user and the target printing apparatus is less than the predetermined distance, the procedure proceeds to step S1309, in which the CPU 101 issues a print instruction for executing printing using the held print data to the printing apparatus 200, and then ends this processing.

FIG. 14 is a flowchart for describing a control procedure performed by the printer control unit 210 of the printing apparatus 200 according to this variation of the third embodiment. A program for executing this processing is stored in the program ROM of the ROM 203, and the processing shown in this flowchart is realized by the CPU 201 executing the stored program. In this case as well, the above-described system configuration and the like are the same as that in the first embodiment described above, and therefore will not be described here.

First, in step S1401, the CPU 201 waits for the reception of print job data from the host computer 400, and when print job data is received, the procedure proceeds to step S1402, in which the CPU 201 holds the received print job data in the RAM 202. Next, the procedure proceeds to step S1403, in which the CPU 201 transmits identification information regarding itself (the printing apparatus 200) to the mobile terminal 100 that corresponds to the mobile terminal information 702 included in the print job data. The procedure then proceeds to step S1404, in which the CPU 201 waits for the reception of the secure printing setting that was made using the mobile terminal 100 from the mobile terminal 100, and determines in step S1405 whether or not the setting is "ON". If the secure printing setting is "ON", the procedure proceeds to step S1406, and otherwise the procedure proceeds to step S1407, in which printing is executed in accordance with the print data that was stored in step S1402.

However, if the secure printing setting is "ON" in step S1405, the procedure proceeds to step S1406, in which the CPU 201 waits for the reception of a print instruction from the mobile terminal 100. When the print instruction is received, the procedure proceeds to step S1407, in which printing is executed in accordance with the print data that was stored in step S1402.

In this way, according to the third embodiment, printing can be realized in both the case where the printing apparatus 200 receives print data from the server PC 300, and the case where it receives print data directly from the host computer 400.

Note that in this case, the mobile terminal 100 may acquire identification information regarding the printing apparatus 200 that is be used for printing from either the host computer 400 or the printing apparatus 200.

Fourth Embodiment

In the third embodiment, the mobile terminal 100 can select "ON/OFF" for the execution of secure printing. In contrast, a fourth embodiment describes the case in which the printing apparatus 200 can furthermore select the secure printing execution method (auto print upon approach, or print after user authentication using the operation panel 221).

Figure 10B:
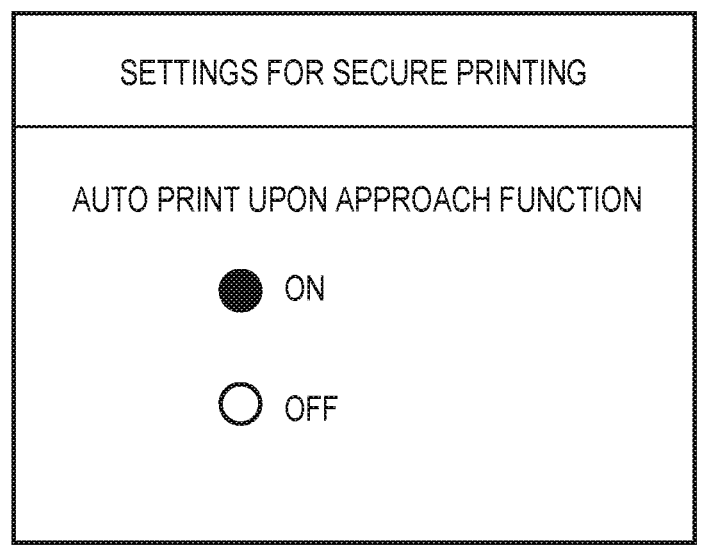
FIG. 10B is a diagram showing a setting screen for setting "ON/OFF" of an "auto print upon approach function" displayed on an operation panel of the printing apparatus.

FIG. 10B is a diagram showing an example of a setting screen for secure printing in the printing apparatus 200 according to the fourth embodiment.

Here, the user can set the secure printing execution method (auto print upon approach, or print after user authentication using the operation panel 221). In the example shown in FIG. 10B, "ON" (enabled) has been set for the auto print upon approach function. Accordingly, in this case, the user can execute desired printing by merely approaching the printing apparatus 200 while holding the mobile terminal 100. However, if "OFF" has been set for the auto print upon approach function, the user inputs their user ID and password using the operation panel 221 of the printing apparatus 200 to perform user authentication, and printing by the printing apparatus 200 is possible only if the authentication is successful. Note that the configuration of the printing system according to the fourth embodiment is basically the same as that of the first embodiment described above, and therefore will not be described here.

The following describes control performed by the mobile control unit 120 of the mobile terminal 100, the server PC control unit 310 of the server PC 300, and the printer control unit 210 of the printing apparatus 200 according to the fourth embodiment with reference to flowcharts.

Figure 15A:
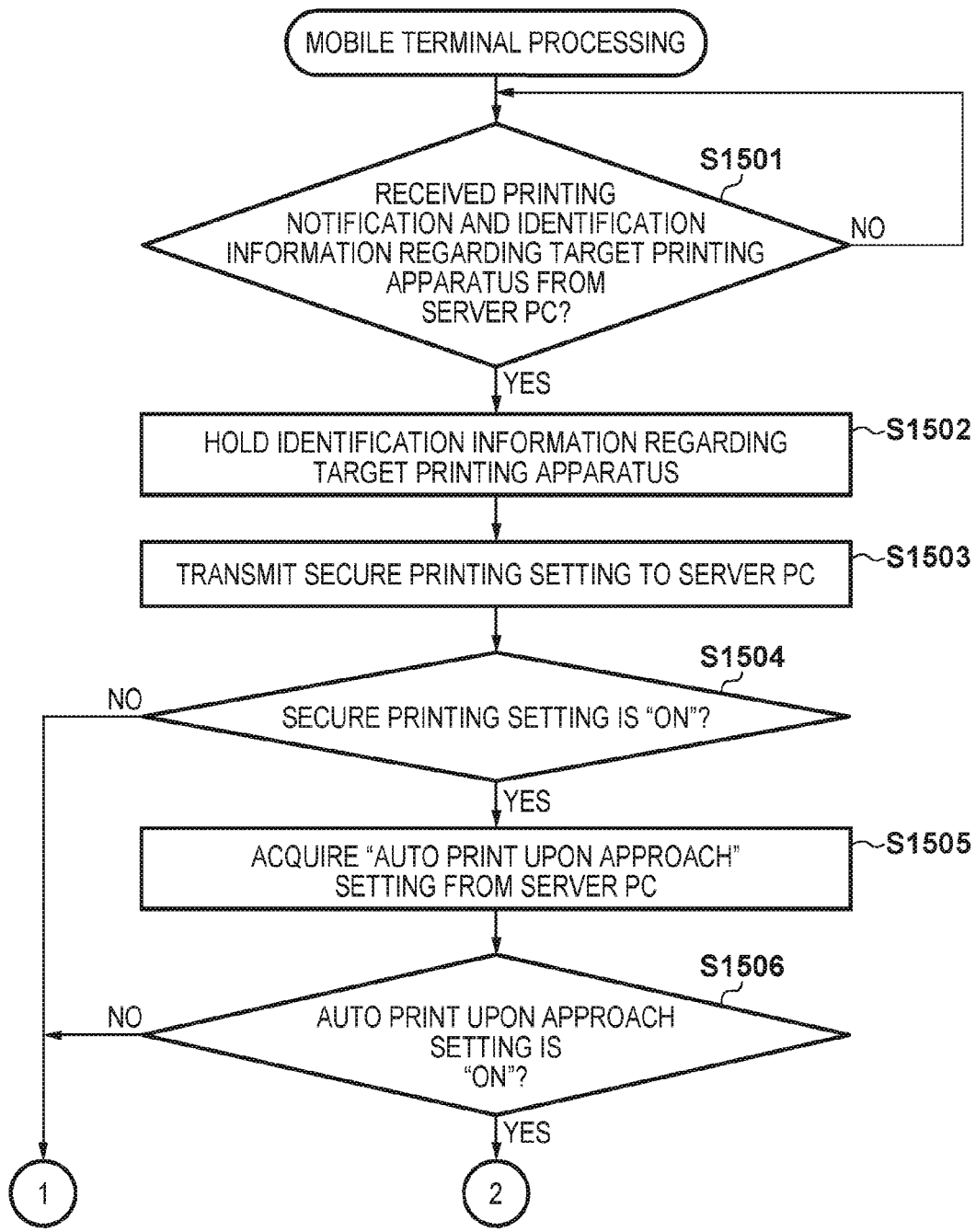
FIGS. 15A and 15B are flowcharts showing a procedure of control processing performed by the mobile control unit of the mobile terminal.
Figure 15B:
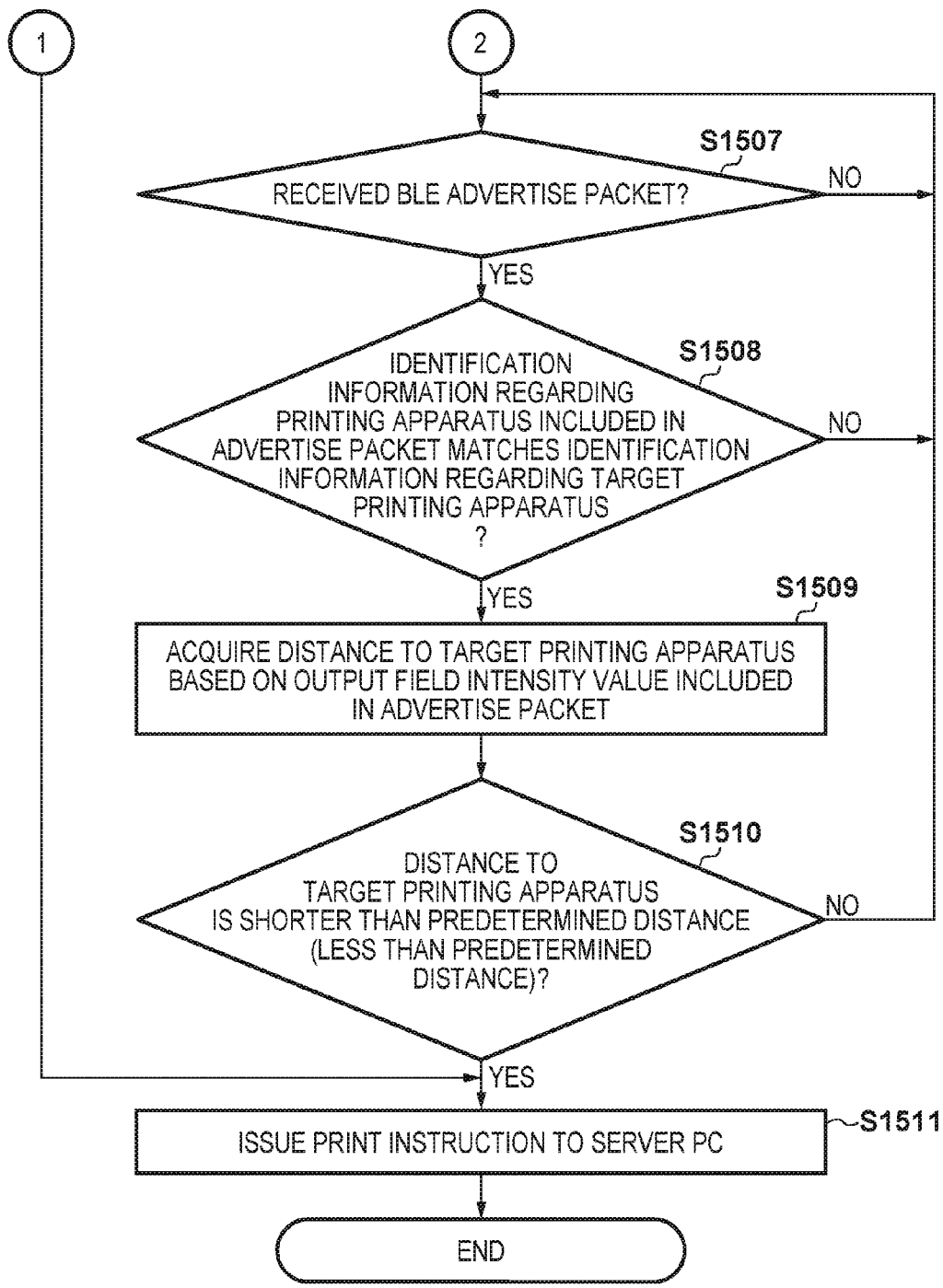

FIGS. 15A and 15B are flowcharts for describing a procedure of control processing performed by the mobile control unit 120 of the mobile terminal 100 according to the fourth embodiment. A program for executing this processing is stored in the program ROM of the ROM 103, and the processing shown in this flowchart is realized by the CPU 101 executing the stored program.

First, in step S1501, the CPU 101 waits for the reception of a print instruction from the server PC 300. Specifically, the CPU 101 waits for the reception of a notification indicating that the execution of printing was instructed, and identification information regarding the target printing apparatus 200 that is to execute printing. When this data is received, the procedure proceeds to step S1502, in which the CPU 101 stores the received identification information regarding the target printing apparatus in the RAM 102. Next, the procedure proceeds to step S1503, in which the CPU 101 acquires the secure printing setting value that was set via the setting screen in FIG. 10A, and transmits the setting to the server PC 300. Next, the procedure proceeds to step S1504, in which the CPU 101 checks the secure printing setting value that was acquired in step S1503, and if "OFF" has been set for secure printing, the procedure proceeds to step S1511, in which the CPU 101 issues a print instruction to the server PC 300 to start printing.

However, if it is determined in step S1504 that "ON" has been set for secure printing, the procedure proceeds to step S1505. In step S1505, the CPU 101 acquires the secure printing execution method ("auto print upon approach function" is ON or OFF) that was set using the setting screen on the printing apparatus 200 shown in FIG. 10B, from the server PC 300. The procedure then proceeds to step S1506, and if the CPU 101 determines in this step that the "auto print upon approach function" setting is "OFF", that is to say, printing is to be executed upon the user inputting their password using the operation panel 221, the procedure proceeds to step S1511, in which the CPU 101 issues a print instruction to the server PC 300, and then ends this processing.

However, if it is determined in step S1506 that the "auto print upon approach function" has been set to "ON", the procedure proceeds to step S1507, in which the CPU 101 waits for the reception of a BLE advertise packet. When the CPU 101 receives a BLE advertise packet in step S1507, the procedure proceeds to step S1508, in which the CPU 101 determines whether or not the received BLE advertise packet includes identification information regarding the target printing apparatus. In other words, it is determined whether or not the BLE advertise packet was transmitted from the target printing apparatus 200. If the BLE advertise packet was not transmitted from the target printing apparatus, the procedure returns to step S1507, and the CPU 101 again waits for the reception of a BLE advertise packet.

However, if the CPU 101 determines in step S1508 that the received BLE advertise packet was transmitted from the target printing apparatus 200, the procedure proceeds to step S1509. In step S1509, the CPU 101 obtains the distance to the target printing apparatus based on the output field intensity value included in the advertise packet. Next, the procedure proceeds to step S1510, in which the CPU 101 determines whether or not the distance to the target printing apparatus is shorter than the predetermined distance, that is to say, whether or not the user holding the mobile terminal 100 has moved to a position closer than the predetermined distance to the target printing apparatus. If it is determined that the distance to the target printing apparatus is greater than or equal to the predetermined distance, the procedure returns to the step S1507, and the CPU 101 again waits for the reception of a BLE advertise packet. However, if it is determined that the distance between the user and the target printing apparatus is less than the predetermined distance, the procedure proceeds to step S1511, in which the CPU 101 issues a print instruction for executing printing according to the held print data to the server PC 300, and then ends this processing.

Figure 16:
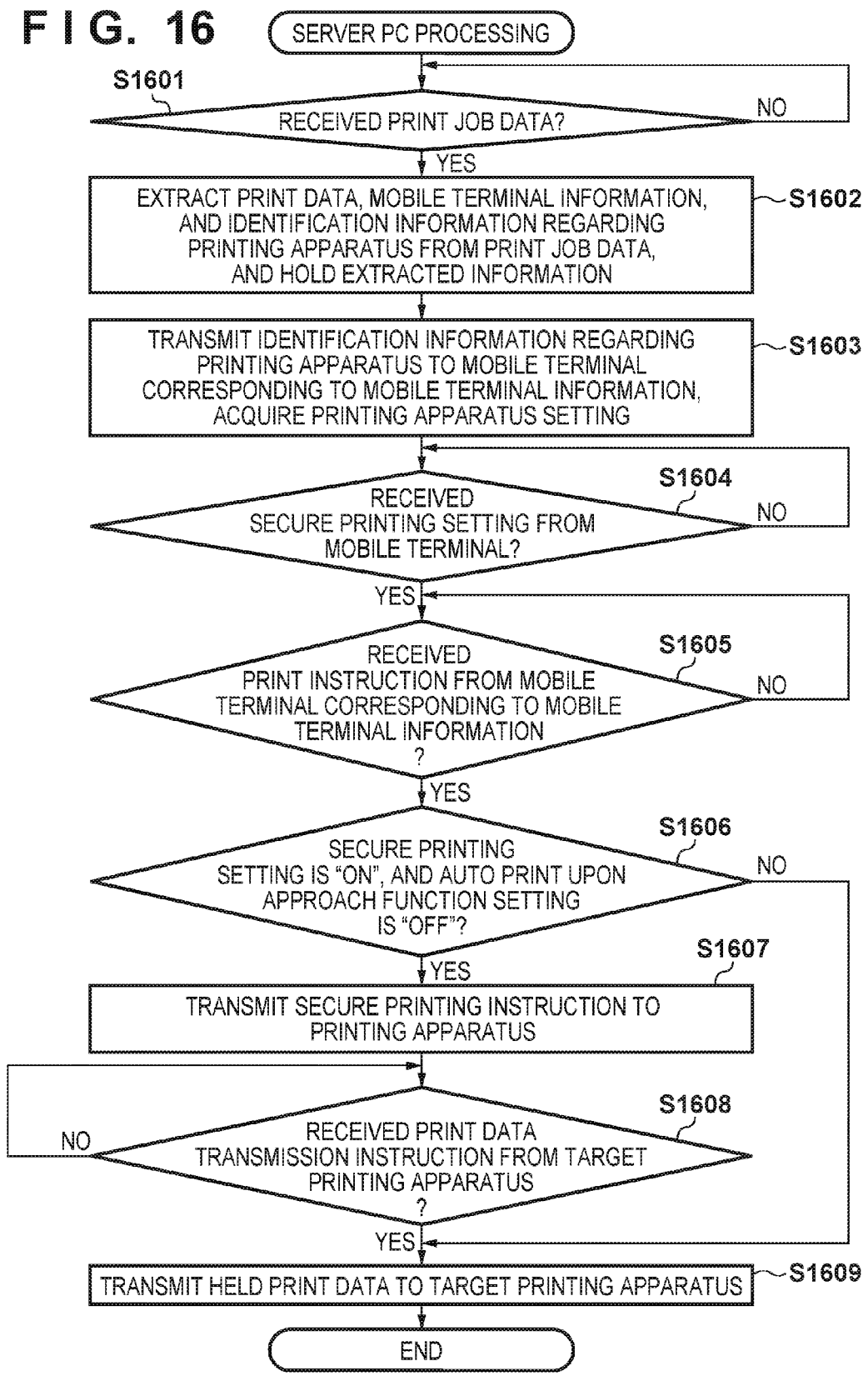
FIG. 16 is another flowchart showing a procedure of control processing performed by the control unit of the server PC.

FIG. 16 is a flowchart for describing a control procedure performed by the server PC control unit 310 of the server PC 300 according to the fourth embodiment. A program for executing this processing is stored in the program ROM of the ROM 303, and the processing shown in this flowchart is realized by the CPU 301 executing the stored program.

First, in step S1601, the CPU 301 waits for the reception of print job data (e.g., see FIG. 7) from the host computer 400. When the print job data is received, the procedure proceeds to step S1602, in which the CPU 301 extracts the print data 701, the mobile terminal information 702, and the printing apparatus identification information 703 from the print job data, and stores these information pieces in the RAM 302. Next, the procedure proceeds to step S1603, in which the CPU 301 transmits, to the mobile terminal 100 that corresponds to the held mobile terminal information 702, a print execution notification and identification information regarding the target printing apparatus to be used for printing. At this time, the value ("ON" or "OFF") of the auto print upon approach function, which was set in the printing apparatus 200, is acquired. Next, the procedure proceeds to step S1604, in which the CPU 301 waits for the reception of a secure printing setting value (ON/OFF) from the mobile terminal 100. When this setting value is received, the procedure proceeds to step S1605, in which the CPU 301 waits for the reception of a print instruction from the mobile terminal 100 that corresponds to the mobile terminal information 702 stored in the RAM 302. When the CPU 301 receives the print instruction from the mobile terminal 100 in step S1605, the procedure proceeds to step S1606, in which the CPU 301 checks the secure printing setting value, and the "auto print upon approach function" setting value. If the secure printing setting is "ON", and the "auto print upon approach function" setting is "OFF", that is to say, in the case of performing secure printing upon a password being inputted using the operation panel 221 of the printing apparatus 200, the procedure proceeds to step S1607. In step S1607, the CPU 301 sends a notification of secure printing in which printing is to be executed upon the user using the operation panel 221 of the target printing apparatus 200 to perform user authentication. The procedure then proceeds to step S1608, in which the CPU 301 waits for the reception of a print data transmission instruction from the printing apparatus 200. When a print data transmission instruction is received from the target printing apparatus 200 in step S1608, the procedure proceeds to step S1609, in which the print data held in the server PC 300 is transmitted to the target printing apparatus.

However, if in step S1606 the CPU 301 makes a determination other than that the secure printing setting is "ON" and the "auto print upon approach function" setting is "OFF", the procedure proceeds to step S1609. In step S1609, the CPU 301 transmits the held print data to the target printing apparatus without waiting for a print data transmission instruction from the target printing apparatus, and then ends this processing.

Figure 17:
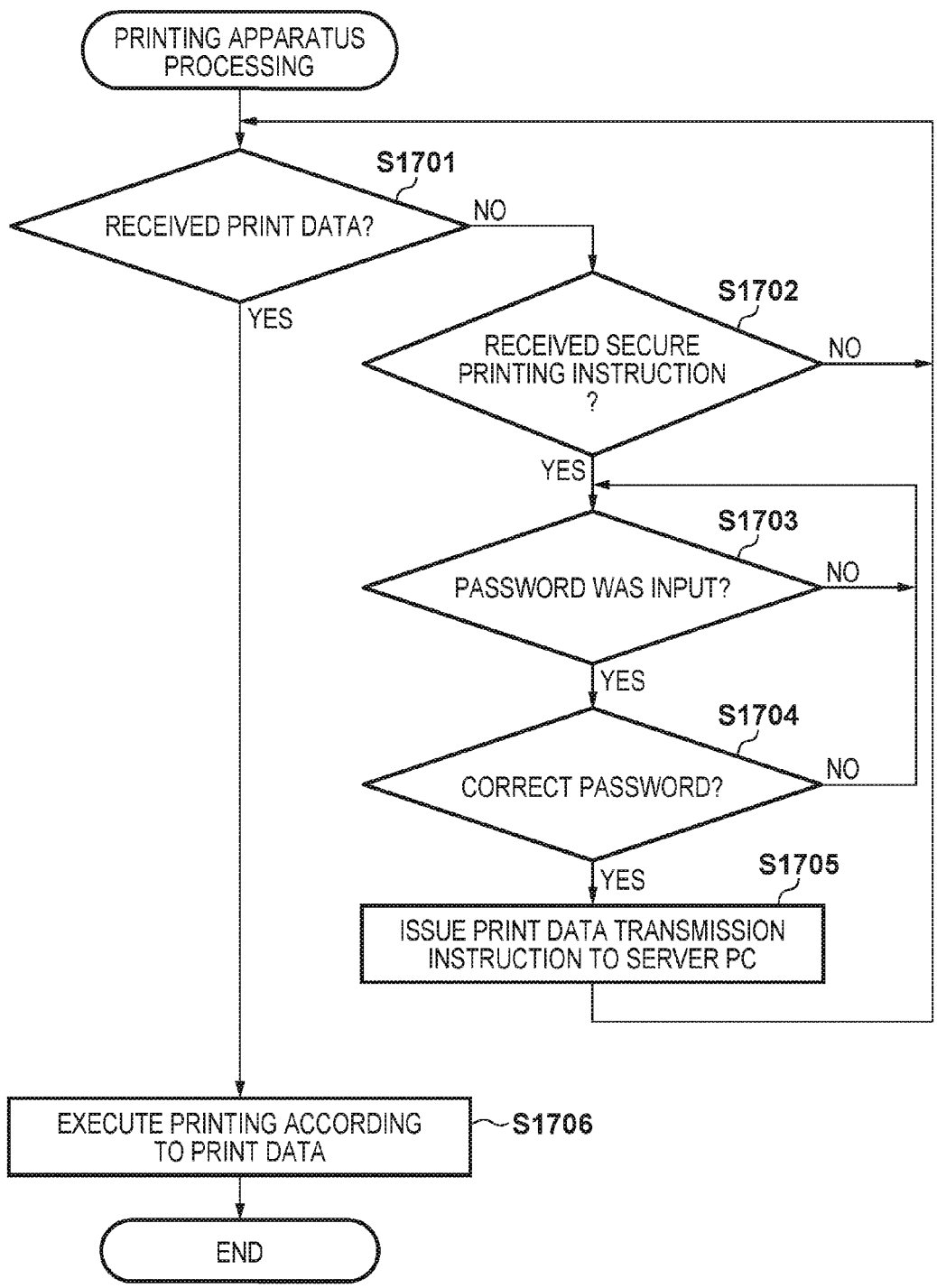
FIG. 17 is another flowchart showing a procedure of control processing performed by the printer control unit of the printing apparatus.

FIG. 17 is a flowchart for describing a control procedure performed by the printer control unit 210 of the printing apparatus 200 according to the fourth embodiment. A program for executing this processing is stored in the program ROM of the ROM 203, and the processing shown in this flowchart is realized by the CPU 201 executing the stored program.

First in step S1701, the CPU 201 waits for the reception of print data from the server PC 300, and when the print data is received, the procedure proceeds to step S1706, in which the CPU 201 executes printing according to the received print data, and then ends this processing.

However, if the CPU 201 does not receive print data in step S1701, the procedure proceeds to step S1702, in which the CPU 201 determines whether or not an instruction has been received for the execution of secure printing upon the input of a password using the operation panel 221. If print data is not received in step S1701, and then an instruction for secure printing upon the input of a password using the operation panel 221 is received, the procedure proceeds to step S1703, in which the CPU 201 waits for the user to input a password by operating the operation panel 221. When a password is input, the procedure proceeds to step S1704, in which it is determined whether or not the correct password was input. Here, if the correct password was input, that is to say, if user authentication was successful, the procedure proceeds to step S1705, in which the CPU 201 issues a print data transmission request to the server PC 300. The procedure then proceeds to step S1701 again, and the CPU 201 waits for the reception of print data from the server PC 300. However, if the CPU 201 determines in step S1704 that the input password is not correct, that is to say, if user authentication failed, the procedure proceeds to step S1703, in which the CPU 201 again waits for the input of a password by the user.

Here, the printing apparatus 200 has received a secure printing instruction in step S1607 of FIG. 16, and therefore the procedure proceeds to step S1702, and when the user has been authenticated via the operation panel 221, the CPU 201 issues a print instruction to the server PC 300 in step S1705. Accordingly, the server PC 300 receives the print instruction in step S1608 in FIG. 16, and transmits the print data to the printing apparatus 200 in step S1609. Accordingly, the printing apparatus 200 receives the print data in step S1701 in FIG. 17, and performs printing in step S1706.

The fourth embodiment described above is also applicable to the case when print job data is directly transmitted from the host computer 400 to the printing apparatus 200 as in the second embodiment. This case will be described below as a variation of the fourth embodiment.

Figure 18B:
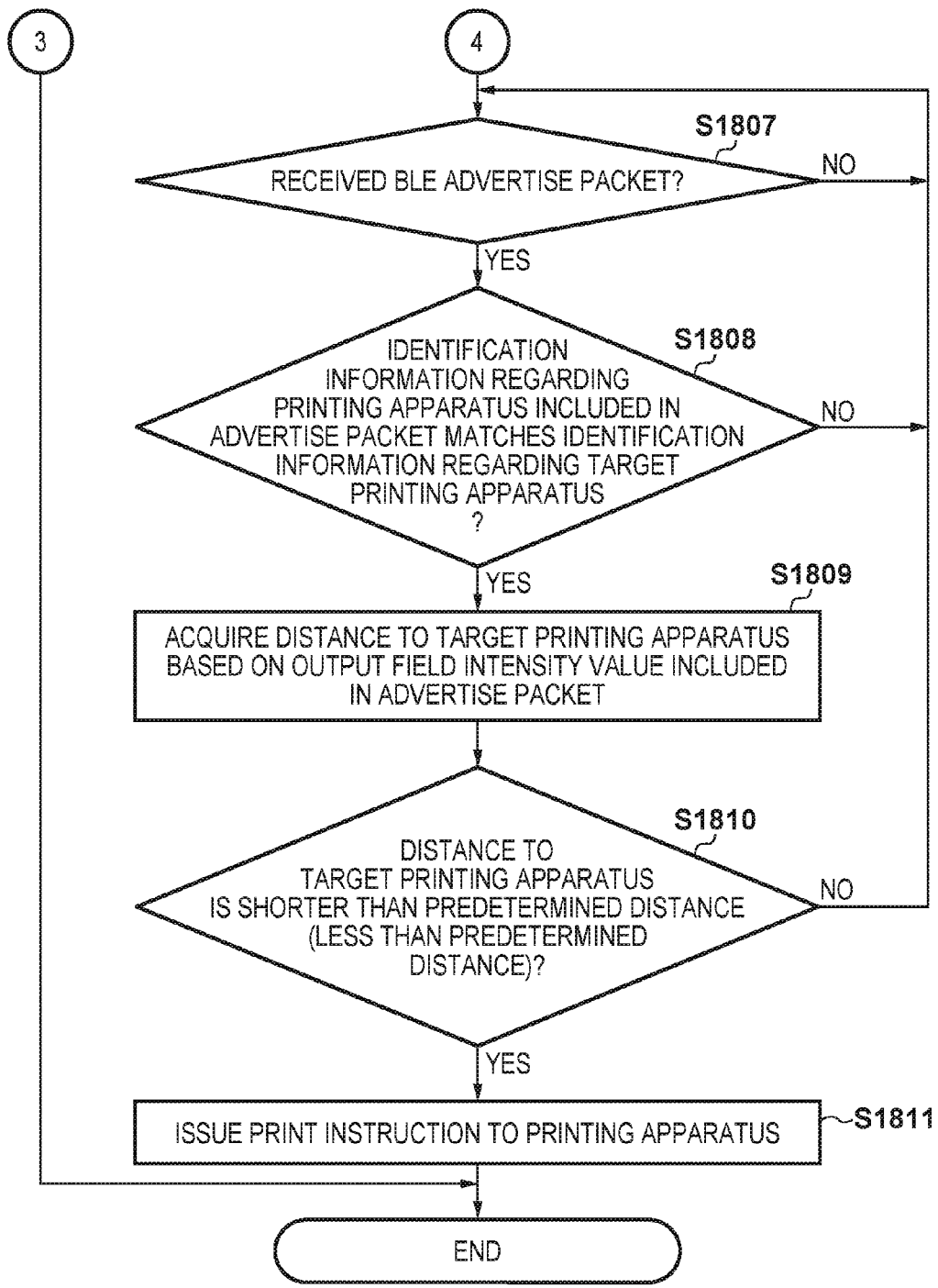

FIGS. 18A and 18B are flowcharts for describing a procedure of control processing performed by the mobile control unit 120 of the mobile terminal 100 according to this variation of the fourth embodiment. A program for executing this processing is stored in the program ROM of the ROM 103, and the processing shown in this flowchart is realized by the CPU 101 executing the stored program.

First, in step S1801, the CPU 101 waits for the reception of a print notification from the host computer 400 or the printing apparatus 200. Specifically, the CPU 101 waits for the reception of a notification indicating that the execution of printing was instructed, and identification information regarding the target printing apparatus 200 that is to execute printing. When this data is received, the procedure proceeds to step S1802, in which the CPU 101 stores the received identification information regarding the target printing apparatus in the RAM 102. Next, the procedure proceeds to step S1803, in which the CPU 101 acquires the secure printing setting value that was set via the print mode setting screen in FIG. 10A, and transmits the setting to the printing apparatus 200. Next, the procedure proceeds to step S1804, in which the CPU 101 checks the secure printing setting value that was acquired in step S1803, and if "OFF" has been set for secure printing, the CPU 101 ends the processing without performing anything.

However, if it is determined in step S1804 that "ON" has been set for secure printing, the procedure proceeds to step S1805. In step S1805, the CPU 101 acquires the secure printing execution method ("auto print upon approach function" is ON or OFF) that was set using the setting screen on the printing apparatus 200 shown in FIG. 10B, from the printing apparatus 200. The procedure then proceeds to step S1806, in which the CPU 101 determines whether the "auto print upon approach function" setting is "OFF", that is to say, whether printing is to be executed upon the user inputting their password using the operation panel 221 of the printing apparatus 200. If this setting is "OFF", the CPU 101 ends this processing without performing anything.

However, if it is determined in step S1806 that the "auto print upon approach function" has been set to "ON", the procedure proceeds to step S1807, in which the CPU 101 waits for the reception of a BLE advertise packet. When the CPU 101 receives a BLE advertise packet in step S1807, the procedure proceeds to step S1808, in which the CPU 101 determines whether or not the received BLE advertise packet includes identification information regarding the target printing apparatus. In other words, it is determined whether or not the BLE advertise packet was transmitted from the target printing apparatus 200. If the CPU 101 determines in step S1808 that the received BLE advertise packet was transmitted from the target printing apparatus 200, the procedure proceeds to step S1809. In step S1809, the CPU 101 obtains the distance to the target printing apparatus based on the output field intensity value included in the advertise packet. Next, the procedure proceeds to step S1810, in which the CPU 101 determines whether or not the distance to the target printing apparatus is shorter than the predetermined distance, that is to say, whether or not the user holding the mobile terminal 100 has moved to a position closer than the predetermined distance to the target printing apparatus. If it is determined that the distance to the target printing apparatus is greater than or equal to the predetermined distance, the procedure returns to the step S1807, and the CPU 101 again waits for the reception of a BLE advertise packet. However, if it is determined that the distance between the user and the target printing apparatus is less than the predetermined distance, the procedure proceeds to step S1811, in which the CPU 101 issues a print instruction for executing printing using the held print data to the target printing apparatus 200, and then ends this processing.

Figure 19:
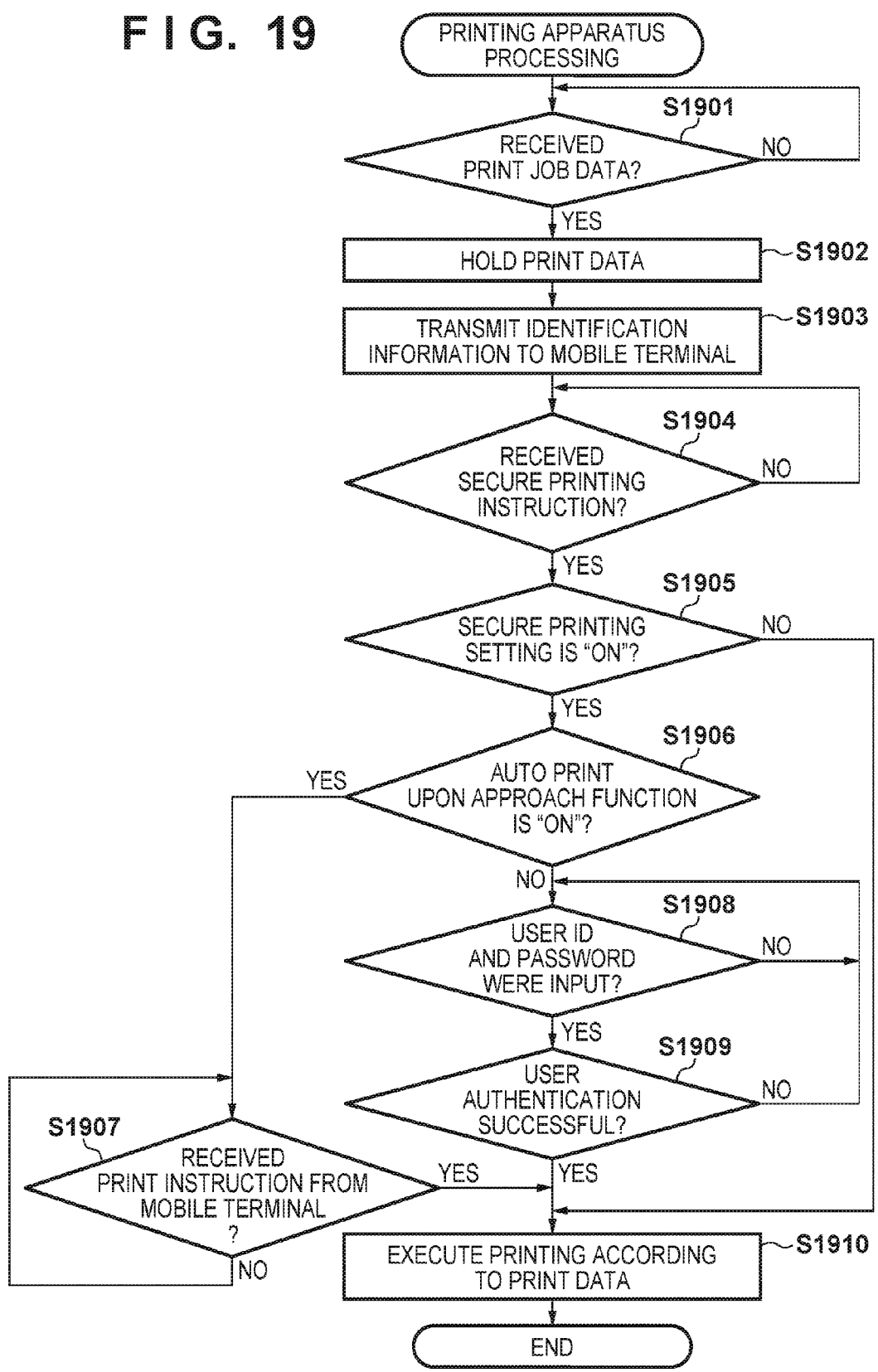
FIG. 19 is another flowchart showing a procedure of control processing performed by the printer control unit of the printing apparatus.

FIG. 19 is a flowchart for describing a control procedure performed by the printer control unit 210 of the printing apparatus 200 according to this variation of the fourth embodiment. A program for executing this processing is stored in the program ROM of the ROM 203, and the processing shown in this flowchart is realized by the CPU 201 executing the stored program.

First, in step S1901, the CPU 201 waits for the reception of print job data from the host computer 400, and when print job data is received, the procedure proceeds to step S1902, in which the CPU 201 stores the received print job data in the RAM 202. Next, the procedure proceeds to step S1903, in which the CPU 201 transmits identification information regarding itself (the printing apparatus 200) to the mobile terminal 100 that corresponds to the mobile terminal information 702 included in the print job data. The procedure then proceeds to step S1904, in which the CPU 201 waits for the reception of the secure printing setting that was made using the mobile terminal 100 from the mobile terminal 100, and determines in step S1905 whether or not the setting is "ON". If the secure printing setting is "ON", the procedure proceeds to step S1906, and otherwise the procedure proceeds to step S1910, in which printing is executed in accordance with the print data that was stored in step S1902.

However, if the secure printing setting is "ON" in step S1905, the procedure proceeds to step S1906, in which the CPU 201 determines whether or not the auto print upon approach function has been set to "ON". If the auto print upon approach function has been set to "ON", the procedure proceeds to step S1907, in which the CPU 201 waits for the reception of a print instruction from the mobile terminal 100, and then when the print instruction is received, the procedure proceeds to step S1910, in which the CPU 201 executes printing, and then ends this processing.

However, if the CPU 201 determines in step S1906 that the auto print upon approach function has been set to "OFF", the procedure proceeds to step S1908, in which the CPU 201 waits for a user ID and password to be input using the operation panel 221, and then the procedure proceeds to step S1909. In this way, if user authentication is successful in step S1909, the procedure proceeds to step S1910, in which printing is executed according to the print data that was stored in step S1902.

In this way, according to the fourth embodiment, printing can be realized in both the case where the printing apparatus 200 receives print data from the server PC 300, and the case where it receives print data directly from the host computer 400.

As described above, according to the fourth embodiment, the execution of secure printing can be set to "ON/OFF" in a setting screen on the mobile terminal 100, and the "auto print upon approach function" can be set to "ON/OFF" in a setting screen on the printing apparatus 200. According to these settings, the user can freely select whether to immediately perform printing, automatically perform printing upon the user approaching the printing apparatus, perform printing after the user has been authenticated by the printing apparatus, or the like.

Various modifications and variations of the above embodiments can be carried out within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029823, filed Feb. 18, 2015, which is hereby incorporated by reference herein in its entirety.

What is claimed is:

1. A printing system comprising:
   a printing apparatus;
   a server; and
   a mobile terminal,
   wherein the server includes:
      at least one non-transitory memory that stores server instructions,
      at least one hardware processor that executes the server instructions to cause the server to function as a receiving unit configured to receive print data from an external apparatus, and a storage unit configured to store the received print data, wherein the printing apparatus includes at least one non-transitory memory that stores printing apparatus instructions, and at least one hardware processor that executes the printing apparatus instructions to cause the printing apparatus to function as:

a first transmission unit configured to transmit a packet, wherein the packet is transmitted by using a near field wireless communication interface, a second transmission unit configured to transmit to the server, based on a reception of a predetermined user operation via an operation unit of the printing apparatus, a first print instruction for receiving the print data from the server, wherein the first print instruction is transmitted by an interface different from the near field wireless communication interface, and a first setting unit configured to set whether to perform printing of the print data stored in the storage unit of the server, triggered by a determination that the mobile terminal and the printing apparatus are within a predetermined distance of each other, based on a user operation via the operation unit of the printing apparatus, wherein the setting of the first setting unit is able to be performed as a predetermined print setting, wherein the mobile terminal includes at least one non-transitory memory that stores mobile terminal instructions, and at least one hardware processor that executes the mobile terminal instructions to cause the mobile terminal to function as:

a reception unit configured to receive the packet transmitted by the first transmission unit, a first determination unit configured to determine whether or not the mobile terminal and the printing apparatus are within the predetermined distance of each other based on radio field intensity of the received packet, and a third transmission unit configured to transmit a second print instruction to the server, triggered by the determination unit determining that the mobile terminal and the printing apparatus are within the predetermined distance of each other, wherein the second print instruction is a print instruction for causing the server to transmit the print data stored in the storage section of the server to the printing apparatus, wherein, in a case in which the first setting unit is set not to perform printing of the print data stored in the storage unit of the server, the third transmission unit does not transmit the second print instruction to the server, triggered by the determination by the first determination unit that the mobile terminal and the printing apparatus are within the predetermined distance of each other, even when the first determination unit determines that the mobile terminal and the printing apparatus are within the predetermined distance of each other, and in a case in which the server receives the first print instruction or the second print instruction, the server transmits the print data to the printing apparatus.

2. The printing system according to claim 1, wherein the packet transmitted by the first transmission unit includes identification information regarding the printing apparatus, wherein the at least one hardware processor of the mobile terminal executes the mobile terminal instructions to cause the mobile terminal to further function as a second determination unit configured to determine whether or not the identification information included in the packet received by the reception unit indicates a predetermined printing apparatus, and wherein the third transmission unit transmits the second print instruction to the server, triggered by the second determination unit determining that the identification information indicates the predetermined printing apparatus, and the first determination unit determining that the mobile terminal and the printing apparatus are within the predetermined distance of each other.

3. The printing system according to claim 1, wherein the at least one hardware processor of the mobile terminal executes the mobile terminal instructions to cause the mobile terminal to further function as a second setting unit configured to set whether to perform secure printing, based on a user operation via an operation unit of the mobile terminal, wherein the setting of the second setting unit is able to be performed as a predetermined print setting, and wherein, in a case which the second setting unit is set not to perform secure printing, the third transmission unit transmits the second print instruction to the server, regardless of a determination result of the first determination unit, triggered by receiving a notification regarding printing from the server.

4. The printing system according to claim 1, wherein the packet is a Bluetooth Low Energy advertise packet.

5. A printing system comprising:

a printing apparatus; and a mobile terminal, wherein the printing apparatus includes:

a storage unit configured to store received print data;

at least one non-transitory memory that stores printing apparatus instructions, and at least one hardware processor that executes the printing apparatus instructions to cause the printing apparatus to function as:

a receiving unit configured to receive print data from an external apparatus, a print control unit configured to execute, based on a reception of a predetermined user operation via an operation unit of the printing apparatus, printing that is based on the print data stored in the storage unit;

a first setting unit configured to set whether to perform printing of the print data stored in the storage unit of the printing apparatus, triggered by a determination that the mobile terminal and the printing apparatus are within the predetermined distance of each other, based on a user operation via the operation unit of the printing apparatus, wherein the setting of the first setting unit is able to be performed as a predetermined print setting; and a first transmission unit configured to transmit a packet, the packet being transmitted by using a near field wireless communication interface, wherein the mobile terminal includes at least one non-transitory memory that stores mobile terminal instructions, and at least one hardware processor that executes the mobile terminal instructions to cause the mobile terminal to function as:

a reception unit configured to receive the packet transmitted by the first transmission unit, a first determination unit configured to determine whether or not the mobile terminal and the printing apparatus are within the predetermined distance of each other based on radio field intensity of the received packet, and a second transmission unit configured to transmit a print instruction to the printing apparatus, triggered by the first determination unit determining that the mobile terminal and the printing apparatus are within the predetermined distance of each other, wherein the print instruction is an instruction for causing the printing apparatus to perform printing based on the print data stored in the storage unit of the printing apparatus, wherein, in a case in which the first setting unit is set not to perform printing of the print data stored in the storage unit of the printing apparatus, the second transmission unit does not transmit the print instruction to the printing apparatus, triggered by the first determination unit determining that the mobile terminal and the printing apparatus are within the predetermined distance of each other, even when the first determination unit determines that the mobile terminal and the printing apparatus are within the predetermined distance of each other, and in a case in which the printing apparatus receives the print instruction, the printing apparatus executes printing that is based on the print data.

6. The printing system according to claim 5, wherein the packet transmitted by the first transmission unit includes identification information regarding the printing apparatus, wherein the at least one hardware processor of the mobile terminal executes the mobile terminal instructions to cause the mobile terminal to further function as a second determination unit configured to determine whether or not the identification information included in the packet received by the reception unit indicates a predetermined printing apparatus, and wherein the second transmission unit transmits the print instruction to the printing apparatus, triggered by the second determination unit determining that the identification information indicates the predetermined printing apparatus, and the first determination unit determining that the mobile terminal and the printing apparatus are within the predetermined distance of each other.

7. The printing system according to claim 5, wherein the at least one hardware processor of the mobile terminal executes the mobile terminal instructions to cause the mobile terminal to further functions as a second setting unit configured to set whether to perform secure printing, based on a user operation via an operation unit of the mobile terminal, wherein the setting of the second setting unit is able to be performed as a predetermined print setting, and wherein, in a case in which the second setting unit is set not to perform secure printing, the second transmission unit does not transmit the print instruction to the printing apparatus, regardless of a determination result of the first determination unit.

8. The printing system according to claim 5, wherein the packet is a Bluetooth Low Energy advertise packet.

9. A mobile terminal capable of communicating with a server that stores print data received from an external apparatus, the mobile terminal comprising:

at least one non-transitory memory that stores mobile terminal instructions, and at least one hardware processor that executes the mobile terminal instructions to cause the mobile terminal to function as:

a reception unit configured to receive a packet transmitted by a printing apparatus, wherein the packet is transmitted via a predetermined near field wireless communication;

a specification unit configured to specify a distance between the mobile terminal and the printing apparatus based on the packet received by the reception unit;

a first determination unit configured to determine whether or not the mobile terminal and the printing apparatus are within a predetermined distance of each other based on radio field intensity of the received packet;

a setting unit configured to set whether to perform printing of the print data stored in the server, triggered by the first determination unit determining that the mobile terminal and the printing apparatus are within the predetermined distance of each other, based on a user operation via an operation unit of the mobile terminal, wherein the setting of the setting unit is able to be performed as a predetermined print setting; and a transmission unit configured to transmit a print instruction to the server, triggered by the first determination unit determining that the mobile terminal and the printing apparatus are within the predetermined distance of each other, wherein the print instruction causes the server to transmit the print data stored in the server to the printing apparatus, wherein, in a case in which the setting unit is set to not perform printing of the print data stored in the server, the transmission unit does not transmit the print instruction to the server, triggered by the first determination unit determining that the mobile terminal and the printing apparatus are within the predetermined distance of each other, even when the first determination unit determines that the mobile terminal and the printing apparatus are within the predetermined distance of each other.

10. The mobile terminal according to claim 9, wherein the packet received by the reception unit includes identification information regarding the printing apparatus, wherein the at least one hardware processor of the mobile terminal executes the mobile terminal instructions to cause the mobile terminal to further function as a second determination unit configured to determine whether or not the identification information included in the packet received by the reception unit indicates a predetermined printing apparatus, and wherein the transmission unit transmits the print instruction to the server, triggered by the second determination unit determining that the identification information indicates the predetermined printing apparatus and the first determination unit determining that the mobile terminal and the printing apparatus are within the predetermined distance of each other.

11. The mobile terminal according to claim 9, wherein the packet is a Bluetooth Low Energy advertise packet.

12. A mobile terminal capable of communicating with a printing apparatus that stores print data received from an external apparatus, the mobile terminal comprising:

at least one non-transitory memory that stores mobile terminal instructions, and at least one hardware processor that executes the mobile terminal instructions to cause the mobile terminal to function as:
 a reception unit configured to receive a packet transmitted by the printing apparatus;
 a first determination unit configured to determine whether or not the mobile terminal and the printing apparatus are within a predetermined distance of each other based on radio field intensity of the received packet; and
 a setting unit configured to set whether to perform printing of the print data stored in the printing apparatus, triggered by the first determination unit determining that the mobile terminal and the printing apparatus are within a predetermined distance of each other, based on a user operation via an operation unit of the mobile terminal, wherein the setting of the setting unit is able to be performed as a predetermined print setting;
 a transmission unit configured to transmit a print instruction to the printing apparatus, triggered by the first determination unit determining that the mobile terminal and the printing apparatus are within the predetermined distance of each other, wherein the print instruction causes the printing apparatus to perform printing based on the print data stored in the printing apparatus,
wherein, in a case in which the setting unit is set to not perform printing of the print data stored in the printing apparatus, the transmission unit does not transmit the print instruction to the printing apparatus, triggered by the first determination unit determining that the mobile terminal and the printing apparatus are within the predetermined distance of each other, even when the first determination unit determines that the mobile terminal and the printing apparatus are within the predetermined distance of each other.

13. The mobile terminal according to claim 12,
wherein the packet received by the reception unit includes identification information regarding the printing apparatus,
wherein the at least one hardware processor of the mobile terminal executes the mobile terminal instructions to cause the mobile terminal to further function as a second determination unit configured to determine whether or not the identification information included in the packet received by the reception unit indicates a predetermined printing apparatus, and
wherein the transmission unit transmits the print instruction to the printing apparatus, triggered by the second determination unit determining that the identification information indicates the predetermined printing apparatus and the first determination unit determining that the mobile terminal and the printing apparatus are within the predetermined distance of each other.

14. The mobile terminal according to claim 12, wherein the packet is a Bluetooth Low Energy advertise packet.

15. A control method executed in a mobile terminal capable of communicating with a server that stores print data received from an external apparatus, the control method comprising:
 receiving a packet transmitted by a printing apparatus, wherein the packet is transmitted via a predetermined near field wireless communication;
 specifying a distance between the mobile terminal and the printing apparatus based on the received packet;
 determining whether or not the mobile terminal and the printing apparatus are within a predetermined distance of each other based on radio field intensity of the received packet;
 setting whether to perform printing of the print data stored in the server, triggered by the determination that the mobile terminal and the printing apparatus are within the predetermined distance of each other, based on a user operation via an operation unit of the mobile terminal, wherein the setting is able to be performed as a predetermined print setting; and
 transmitting the print instruction to the server, triggered by determining that the mobile terminal and the printing apparatus are within the predetermined distance of each other, wherein the print instruction causes the server to transmit the print data stored in the server to the printing apparatus,
wherein, in a case in which the setting is to not perform printing of the print data stored in the server, the print instruction is not transmitted to the server, triggered by the determination that the mobile terminal and the printing apparatus are within the predetermined distance of each other, even when it is determined that the mobile terminal and the printing apparatus are within the predetermined distance of each other.

16. The control method according to claim 15,
wherein the packet received by the mobile terminal from the printing apparatus includes identification information regarding the printing apparatus, and
the control method further comprises:
 determining whether or not the identification information included in the received packet indicates a predetermined printing apparatus, and
 transmitting the print instructions to the server, triggered by determining that the identification information indicates the predetermined printing apparatus and determining that the mobile terminal and the printing apparatus are within the predetermined distance of each other.

17. The control method according to claim 15, wherein the packet is a Bluetooth Low Energy advertise packet.

18. A control method executed in a mobile terminal capable of communicating with a printing apparatus that stores print data received from an external apparatus, the control method comprising:
 receiving a packet transmitted by the printing apparatus;
 determining whether or not the mobile terminal and the printing apparatus are within a predetermined distance of each other based on radio field intensity of the received packet;
 setting whether to perform printing of the print data stored in the printing apparatus, triggered by the determination that the mobile terminal and the printing apparatus are within the predetermined distance of each other, based on a user operation via an operation unit of the mobile terminal, wherein the setting is able to be performed as a predetermined print setting; and
 transmitting the print instruction for the print data to the printing apparatus, triggered by determining that the mobile terminal and the printing apparatus are within the predetermined distance of each other,
wherein, in a case in which the setting is to not perform printing of the print data stored in the printing apparatus, the print instruction is not transmitted to the printing apparatus, triggered by the determination that the mobile terminal and the printing apparatus are within the predetermined distance of each other, even when it is determined that the mobile terminal and the printing apparatus are within the predetermined distance of each other.

19. The control method according to claim 18, wherein the packet received by the mobile terminal from the printing apparatus includes identification information regarding the printing apparatus, and the control method further comprises:
   determining whether or not the identification information included in the received packet indicates a predetermined printing apparatus, and
   transmitting the print instruction to the printing apparatus, triggered by determining that the identification information indicates the predetermined printing apparatus and determining that the mobile terminal and the printing apparatus are within the predetermined distance of each other.

20. The control method according to claim 18, wherein the packet is a Bluetooth Low Energy advertise packet.

* * * * *